(12) United States Patent
Tsuchida et al.

(10) Patent No.: US 8,434,103 B2
(45) Date of Patent: Apr. 30, 2013

(54) METHOD OF SUBSTITUTING CONTENT DURING PROGRAM BREAKS

(75) Inventors: Ted Tsuchida, Woodinville, WA (US); Douglas A. Miller, Seattle, WA (US); Robert E. Novak, Kirkland, WA (US)

(73) Assignee: ARRIS Group, Inc., Suwanee, GA (US)

( * ) Notice: Subject to any disclaimer, the term of this patent is extended or adjusted under 35 U.S.C. 154(b) by 2813 days.

(21) Appl. No.: 09/963,136

(22) Filed: Sep. 24, 2001

(65) Prior Publication Data

US 2002/0194593 A1 Dec. 19, 2002

Related U.S. Application Data

(63) Continuation-in-part of application No. 09/883,098, filed on Jun. 14, 2001, now Pat. No. 7,266,832.

(51) Int. Cl.
 *H04N 7/10* (2006.01)
(52) U.S. Cl.
 USPC .......... 725/34; 725/41; 725/42; 725/43
(58) Field of Classification Search .......... 725/34, 725/109–114, 32, 36, 39–43
 See application file for complete search history.

(56) References Cited

U.S. PATENT DOCUMENTS

| | | | |
|---|---|---|---|
| 4,303,937 A | 12/1981 | Cook | |
| 4,331,974 A | 5/1982 | Cogswell et al. | |
| 4,404,589 A | 9/1983 | Wright, Jr. | |
| 4,630,108 A | 12/1986 | Gomersall | |
| 4,706,121 A | 11/1987 | Young | |
| 4,814,883 A | 3/1989 | Perine et al. | 358/181 |
| 4,829,372 A | 5/1989 | McCalley et al. | 358/86 |
| 4,888,638 A | 12/1989 | Bohn | |
| 4,974,085 A | 11/1990 | Campbell et al. | 358/181 |
| 5,029,014 A | 7/1991 | Lindstrom | 358/342 |
| 5,055,924 A | 10/1991 | Skutta | |
| 5,099,319 A | 3/1992 | Esch et al. | 358/86 |
| 5,155,591 A | 10/1992 | Wachob | 358/86 |
| 5,233,423 A | 8/1993 | Jernigan et al. | 358/181 |
| 4,706,121 B1 | 12/1993 | Young | |
| 5,353,121 A | 10/1994 | Young et al. | |
| 5,446,919 A | 8/1995 | Wilkins | 455/6.2 |
| 5,479,266 A | 12/1995 | Young et al. | |

(Continued)

FOREIGN PATENT DOCUMENTS

WO   WO 99/55066   10/1999

OTHER PUBLICATIONS

Sanders, E., "TV Ads Will Soon Be Watching You." Seattle Times, http://seattletimes.nwsource.com/html/nationworld/134305752_commericals12.html Jun. 12, 2001, 4 pgs.

(Continued)

*Primary Examiner* — Kristine Kincaid
*Assistant Examiner* — Sumaiya A Chowdhury
(74) *Attorney, Agent, or Firm* — Troy A. Van Aacken; Robert J. Starr

(57) ABSTRACT

A method of substituting content during a program break, includes: detecting a break in a broadcast program, and in response to the break, showing substitute content. A method of substituting broadcast content displayed on a screen, includes: determining an occurrence of a break in a broadcast content; and in response to the occurrence of the break, displaying substitute content on the screen. The method may further include: displaying the broadcast content when the break terminates.

34 Claims, 16 Drawing Sheets

U.S. PATENT DOCUMENTS

| | | | | |
|---|---|---|---|---|
| 5,479,268 | A | 12/1995 | Young et al. | |
| 5,532,754 | A | 7/1996 | Young et al. | |
| 5,585,858 | A | 12/1996 | Harper et al. | 348/485 |
| 5,600,366 | A | 2/1997 | Schulman | 348/9 |
| 5,661,516 | A | 8/1997 | Carles | 348/8 |
| 5,715,018 | A | 2/1998 | Fasciano et al. | 348/722 |
| 5,727,060 | A | 3/1998 | Young | |
| 5,745,837 | A | 4/1998 | Fuhrmann | 455/5.1 |
| 5,774,170 | A | 6/1998 | Hite et al. | 348/9 |
| 5,774,664 | A | 6/1998 | Hidary et al. | 395/200.48 |
| 5,774,666 | A | 6/1998 | Portuesi | 395/200.48 |
| 5,790,806 | A | 8/1998 | Koperda | 395/200.82 |
| 5,805,974 | A | 9/1998 | Hite et al. | |
| 5,809,204 | A | 9/1998 | Young et al. | |
| 5,833,468 | A * | 11/1998 | Guy et al. | 434/350 |
| 5,870,150 | A | 2/1999 | Yuen | |
| 5,886,746 | A | 3/1999 | Yuen et al. | |
| 5,892,536 | A | 4/1999 | Logan et al. | 348/13 |
| 5,909,670 | A | 6/1999 | Trader et al. | |
| 5,929,849 | A | 7/1999 | Kikinis | |
| 5,929,850 | A | 7/1999 | Broadwin et al. | |
| 5,940,073 | A | 8/1999 | Klosterman et al. | |
| 5,970,206 | A | 10/1999 | Yuen et al. | |
| 5,973,723 | A | 10/1999 | DeLuca | 348/9 |
| 5,974,222 | A | 10/1999 | Yuen et al. | |
| 5,986,692 | A | 11/1999 | Logan et al. | 348/13 |
| 5,995,092 | A | 11/1999 | Yuen et al. | 345/327 |
| 6,002,393 | A | 12/1999 | Hite et al. | 345/327 |
| 6,020,912 | A | 2/2000 | De Lang | |
| 6,029,045 | A * | 2/2000 | Picco et al. | 725/34 |
| 6,061,719 | A | 5/2000 | Bendinelli et al. | 709/218 |
| 6,064,420 | A | 5/2000 | Harrison et al. | 348/12 |
| 6,070,186 | A | 5/2000 | Nishio | 709/217 |
| 6,100,941 | A | 8/2000 | Dimitrova et al. | 348/700 |
| 6,119,098 | A | 9/2000 | Guyot et al. | |
| 6,141,010 | A | 10/2000 | Hoyle | 345/356 |
| 6,160,570 | A | 12/2000 | Sitnik | 348/1 |
| 6,177,931 | B1 | 1/2001 | Alexander et al. | 345/327 |
| 6,215,483 | B1 | 4/2001 | Zigmond | 345/327 |
| 6,230,203 | B1 | 5/2001 | Koperda et al. | 709/229 |
| 6,233,389 | B1 | 5/2001 | Barton et al. | 386/46 |
| 6,240,555 | B1 | 5/2001 | Shoff et al. | 725/110 |
| 6,252,952 | B1 | 6/2001 | Kung et al. | 379/114 |
| 6,263,505 | B1 * | 7/2001 | Walker et al. | 725/110 |
| 6,282,713 | B1 * | 8/2001 | Kitsukawa et al. | 725/36 |
| 6,483,895 | B2 | 11/2002 | Bixler et al. | |
| 6,487,538 | B1 | 11/2002 | Gupta et al. | 705/14 |
| 6,546,556 | B1 | 4/2003 | Kataoka et al. | 725/35 |
| 6,546,566 | B1 | 4/2003 | Geisel | 4/144.1 |
| 6,588,015 | B1 * | 7/2003 | Eyer et al. | 725/89 |
| 6,636,271 | B1 | 10/2003 | Megeid | |
| 6,691,310 | B2 | 2/2004 | Hirasawa et al. | |
| 6,698,020 | B1 * | 2/2004 | Zigmond et al. | 725/34 |
| 6,732,183 | B1 * | 5/2004 | Graham | 709/231 |
| 6,792,615 | B1 | 9/2004 | Rowe et al. | |
| 6,937,841 | B1 | 8/2005 | Guy et al. | 434/350 |
| 6,961,954 | B1 * | 11/2005 | Maybury et al. | 725/53 |
| 7,079,176 | B1 * | 7/2006 | Freeman et al. | 348/207.1 |
| 7,181,756 | B1 * | 2/2007 | Zigmond et al. | 725/43 |
| 2001/0013123 | A1 | 8/2001 | Freeman et al. | |
| 2001/0025377 | A1 | 9/2001 | Hinderks | 725/109 |
| 2001/0050920 | A1 | 12/2001 | Hassell et al. | 370/465 |
| 2002/0083439 | A1 * | 6/2002 | Eldering | 725/32 |
| 2002/0100043 | A1 | 7/2002 | Lowthert et al. | |
| 2002/0124246 | A1 | 9/2002 | Kaminsky et al. | 725/9 |
| 2002/0144262 | A1 | 10/2002 | Plotnick et al. | 725/32 |
| 2002/0194589 | A1 | 12/2002 | Cristofalo et al. | |
| 2003/0005463 | A1 * | 1/2003 | Macrae et al. | 725/112 |
| 2003/0037068 | A1 | 2/2003 | Thomas et al. | |
| 2005/0015796 | A1 | 1/2005 | Bruckner et al. | |

OTHER PUBLICATIONS

"Claria—A Leader in Online Behavioral Marketing," http://www.claria.com/ Retrieved May 26, 2004, 7 pgs.

Office Action Mailed Dec. 15, 2005 for U.S. Appl. No. 09/963,092, filed Sep. 24, 2001.

Office Action Mailed Jun. 14, 2006, for U.S. Appl. No. 09/963,092, filed Sep. 24, 2001.

Office Action Mailed Jun. 16, 2006, for U.S. Appl. No. 09/963,093, filed Sep. 24, 2001.

Office Action Mailed Dec. 18, 2006, for U.S. Appl. No. 09/963,092, filed Sep. 24, 2001.

Office Action Mailed Jul. 2, 2007 for U.S. Appl. No. 09/963,092, filed Sep. 24, 2001.

Office Action Mailed Dec. 15, 2005 for U.S. Appl. No. 09/963,093, filed Sep. 24, 2001.

Office Action Mailed Nov. 20, 2006 for U.S. Appl. No.. 09/963,093, filed Sep. 24, 2001.

Office Action Mailed May 3, 2007 for U.S. Appl. No. 09/963,093, filed Sep. 24, 2001.

* cited by examiner

METHOD OF SUBSTITUTING CONTENT DURING PROGRAM BREAKS

CROSS-REFERENCE TO RELATED APPLICATION

The present application is a continuation-in-part of and claims the benefit of U.S. patent application Ser. No. 09/883,098, entitled "ADVERTISEMENT SWAPPING USING AN AGGREGATOR FOR AN INTERACTIVE TELEVISION SYSTEM" by Douglas A. Miller, filed Jun. 14, 2001 now U.S. Pat. No. 7,266,832. U.S. Application Ser. No. 09/883,098 is fully incorporated herein by reference.

TECHNICAL FIELD

This disclosure relates generally to television programming content substitution methods and systems, and more particularly but not exclusively, to techniques for substituting programming content during commercial breaks or other breaks in a broadcast content.

BACKGROUND

Conventionally, personal video recorders (PVRs) enable a viewer to record television programming content and then to view the recorded television programming content at a later time. Further, PVRs may enable a viewer to record specified programming content on a regular basis and to delete the recorded programming content after a pre-specified amount of time. For example, a viewer may program a PVR to record a daily news show (such as the 5 o'clock news) on a daily basis and then to automatically delete the recorded news show after one day since the news content would be stale.

In order to view the recorded programming content, a viewer typically proceeds through multiple steps, which may include loading a user interface (UI) for display, selecting a "view pre-recorded programming content" option from a menu in the UI, and then selecting a pre-recorded programming content from a list of several pre-recorded programming content.

PVRs also enable a viewer to pause "live" programming content (and/or buffered programming content) and to skip commercials and/or other portions of live television programming content (or buffered programming content). For example, a viewer can skip commercials when viewing programming content on a television coupled to a PVR by pressing a "skip" button of the PVR remote control device.

Thus, advertisers are concerned that the ability of viewers to skip commercials when viewing programming content with PVRs will lead to losses in revenue. Additionally, a viewer, while watching live TV may channel surf and lose the buffered portion of the content shown in the original channel.

Accordingly, there is need for a new programming content substitution system and method that will overcome the deficiencies mentioned above.

BRIEF DESCRIPTION OF THE DRAWINGS

Non-limiting and non-exhaustive embodiments of the present invention are described with reference to the following Figures, wherein like reference numerals refer to like parts throughout the various views unless otherwise specified.

DETAILED DESCRIPTION OF THE ILLUSTRATED EMBODIMENTS

Figure 1:
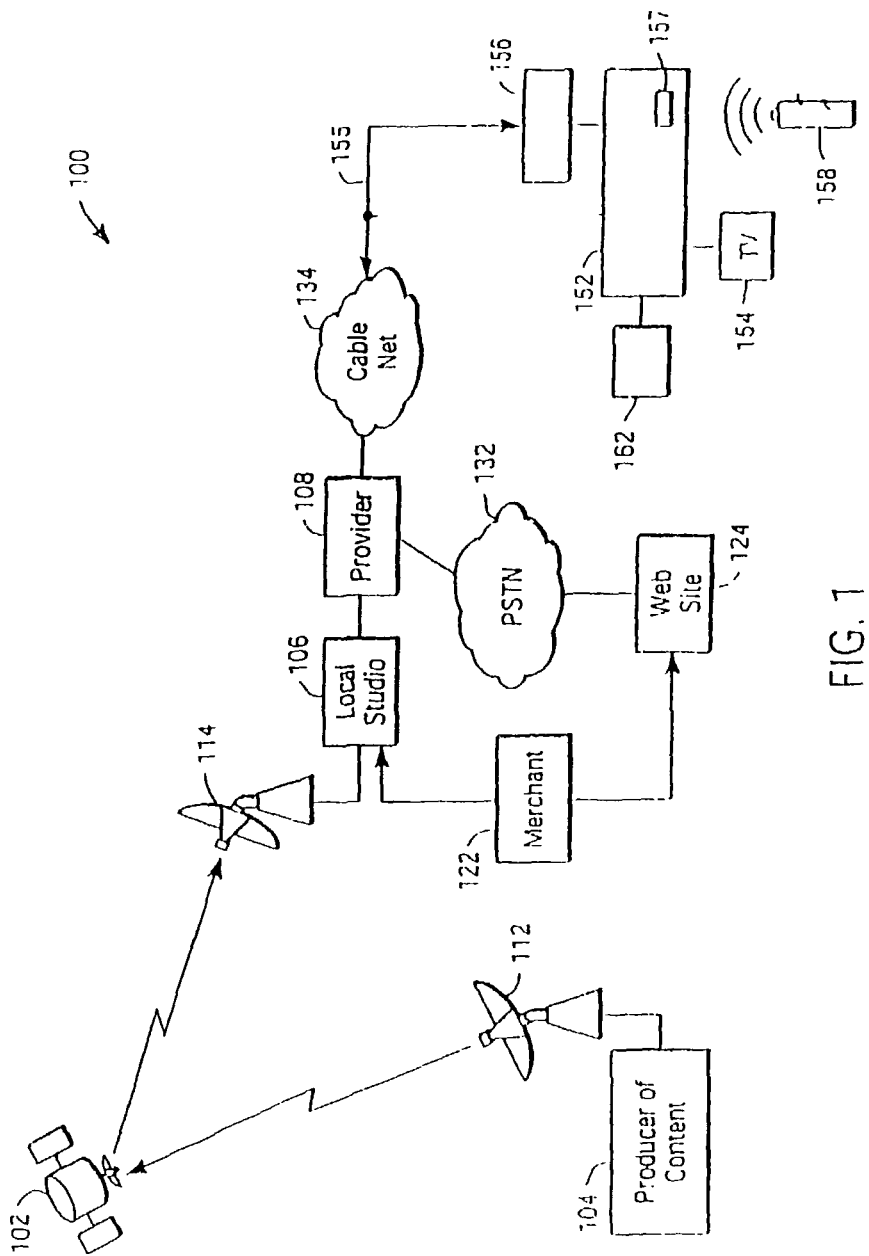
FIG. 1 is a block diagram of an interactive video casting system that can implement an embodiment of the invention.

Embodiments of a system and method for substituting a live or pre-recorded (or buffered) programming content (i.e., broadcast content) with a substitute content are disclosed herein. The substitute content may be, for example, a viewer-selected content or default content. As an overview, in an embodiment, a broadcast content substitution system includes a customer premise equipment (or other processor) that can permit the display of broadcast content. In response to the occurrence of a break in the broadcast content, the customer premise equipment can permit the display of substitute content. The break may be, for example, a commercial in a live broadcast content, a commercial skip segment in a buffered live broadcast content, a broadcast stoppage, or a non-activity in a broadcast event. When the break in the broadcast content terminates, the customer premise equipment can again permit the display of the broadcast content. During the occurrence of the break, the customer premise equipment may permit the display of the substitute content and images related to the break in the broadcast content.

In another embodiment, the invention broadly provides a customer premise equipment (or other processing device) that includes a recording engine and a playback engine. The recording engine enables a viewer to select programming content to record on, for example, a regular basis, which is sometimes referred to as a "season's pass." For example, a viewer can program the recording engine to record a 5 o'clock news show on a daily basis. The recording engine may also automatically delete recorded programming content after a selected amount of time.

The playback engine, upon receiving a user-enabled command signal, can substitute the substitute content in place of the currently-displayed live programming content or buffered programming content. In another embodiment, commercial breaks in the currently-displayed live programming content or buffered programming content are automatically detected, and the substitute content is automatically displayed during the commercial breaks. The substitute content can be a previously-recorded programming content, a live programming content, or content from an Internet Protocol (IP) channel, such as streaming video, electronic mail interaction, and so on. The electronic mail interaction would be automatically activated during, for example, commercial breaks and de-activated (or paused/halted) during the non-commercial segments in the live programming content or buffered programming content. The substitute content may be specified by the user or may be a default content.

In another embodiment, the substitute content is displayed during breaks in a video telecast or teleconference (where a teleconference may be, for example, a Remote Learning Session or Video Conference). A break in a live action in a video telecast or teleconference may occur, for example, when there is a change in speakers, during the time when equipment is set up, during unforeseen delays in the presentation, and so on.

The substitute content may, for example, be displayed in full screen mode on a television. Alternatively or in addition, the substitute content may be displayed as the main screen view, while the live or other programming content is displayed as a picture-in-picture on the television screen. Alternatively or in addition, the substitute content may be displayed as a picture overlay on the television screen foreground, while the live or other programming content is displayed on the television screen background. Alternatively or in addition, the substitute content and the live or other programming content may be displayed in separate screen areas as split screen views on the television screen.

In another embodiment, the invention broadly provides a customer premise equipment (or other processing device) that includes a trigger marking engine and a trigger viewing engine. The customer premise equipment can receive programming content that includes Advanced Television Enhancement Forum (ATVEF) triggers or other types of triggers. One type of trigger, ATVEF B. may also be used and includes content as well as triggers. If a viewer is interested in a particular trigger that appears on the television screen, then the viewer can, for example, enable a command to signal the customer premise equipment to mark a Uniform Resource Locator (URL) address (or other address information peculiar to the Internet or other data communication network) where the address is associated with the trigger of interest. The URL address or other address is then stored for later viewing and access. During a commercial or other breaks in a live or buffered broadcast content, the viewer can then signal the customer premise equipment to show and access the stored URL address (or other address) in order to view information associated with previous triggers of interest. When a website (or other information) associated with the accessed URL address (or other address) is shown, the website may, for example, be shown in full screen on the television. Alternatively or in addition, the website may be displayed on the television screen, while the live or buffered broadcast content is displayed as a picture-in-picture on the television screen. Alternatively or in addition, the website may be displayed as a picture overlay on the television screen foreground, while the live or buffered broadcast content is displayed on the television screen background. Alternatively or in addition, the website and the live or buffered broadcast content may be displayed in separate areas as split screen views on the television screen. The viewer can then, for example, obtain information or buy items or services in the displayed website. The viewer may then return to viewing the live or buffered broadcast content by enabling an appropriate command, for example, via the remote control device.

In another embodiment of the invention, an aggregator can be used to aggregate user-selected content. The aggregated user-selected content can then be provided for playback to the user, for example, during commercial breaks in a live or buffered programming content or during breaks in a video telecast or teleconference. For example, the aggregator can be used to locate and collect programming content (or portions of a programming content) related to a specific topic as specified by the user. The collected programming content can then be displayed during commercial breaks in a live or buffered broadcast or during breaks in a video telecast or teleconference. In one embodiment, the aggregator can provide the aggregated user-selected content to a storage unit (such as a PVR) for subsequent playback. In another embodiment, a customer premise equipment (such as a set top box) can perform channel switching to switch from a channel where the live or buffered programming content is showing to another channel (e.g., a dedicated broadcast channel) where the aggregated user-selected content can be shown.

In the description herein, numerous specific details are provided, such as examples of system components and/or methods, to provide a thorough understanding of embodiments of the invention. One skilled in the relevant art will recognize, however, that the invention can be practiced without one or more of the specific details, or with other systems, methods, components, materials, parts, and/or the like. In other instances, well-known structures, materials, or operations are not shown or described in detail to avoid obscuring aspects of the invention.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

It will also be appreciated that one or more of the elements depicted in the drawings/figures can also be implemented in a more separated or integrated manner, or even removed or rendered as inoperable in certain cases, as is useful in accordance with a particular application.

FIG. 1 is a block diagram of an interactive video casting system 100 that can implement a specific embodiment of the invention. Of course, the illustrated system 100 is provided for example purposes only, and other systems or topologies may be used within the scope of the invention. In an embodiment, a production company 104 produces programming content for transmission to viewers. The transmission is sent via a satellite transmission transceiver 112 over an uplink channel to a satellite 102. The satellite 102 then transmits the programming content over a downlink channel to a local studio 106. The local studio 106 can insert additional programming content (e.g., regional programming content) and/or advertisements as needed into the programming content. The programming content with the insertions is then transmitted from the local studio 106 to a cable service provider 108. The television programming content may be downloaded to a receiving station, such as a broadcast center (e.g., cable distribution head-end) (not shown) of the cable service provider 108, rather than or in addition to the local studio 106. A reverse channel from the cable service provider 108 to the local studio 106 may be provided so that the local studio 106 can insert additional programming content and feed the television signal back to the cable service provider 108. The cable service provider 108 then delivers the television signal over a cable network 134 to cable subscribers.

The cable network 134 is provided by the cable service provider 108 to distribute the programming content to cable subscribers. A set top box (STB) 152, typically located on the premises of a cable television subscriber, receives the programming content or television signal from the cable net 134, and delivers the television signal to the subscriber's television set (or other display device) 154. In some specific embodiments, alternatively or in addition, the television signal can be broadcast over a wireless medium and received by a traditional aerial antenna or by a satellite dish, and then delivered to the set top box 152. Alternatively or additionally, features and functionality of the set top box 152 may be integrated into a type of advanced television or other display device.

Moreover, embodiments of the invention can use other types of broadcast media, including but not limited to, digital cable systems, satellite, very-high-data-rate digital subscriber line (VDSL), web casts, and the like. The features provided by the television set 154 can also be provisioned, in one embodiment, by a personal computer (PC) suitably configured with an adapter to convert television signals into a digitized format, and then to deliver the television signals to the video portion of the computer for display. It is noted that the invention is not limited to any one configuration of display hardware as embodiments of the invention can be realized using alternative reception and display arrangements, as known to those skilled in the art.

In accordance with an embodiment of the invention, a connection to a communication network is provided for the cable subscriber. In one embodiment, the connection can be made via a cable modem 156 over a bi-directional communication link 155 to a cable modem termination system within the cable provider's 108 equipment. The connection continues to a data communication network, such as the Internet, by way of a public switched telephone network (PSTN) 132. The PSTN network 132 is provided herein as an example, and it is understood that other types of networks may be used for connectivity to the Internet. A cable modem arrangement can be used because of its high bandwidth capability. In situations where some cable companies are not equipped to provide cable modem service to their customers, various other arrangements can be made. For example, a conventional modem connection can be used to access the Internet over a telephone line. As another example, Internet access can be gained over a DSL connection or an integrated services digital network (ISDN) connection using a telephone line. Wireless systems are also available for providing Internet access. In one embodiment, downstream data transmission may occur via cable or satellite, and upstream data transmission may occur via a telephone line.

It is noted that the Internet is chosen as an example of a data communication network because it is a well-established network, and connectivity to the Internet is easily made. However, it is noted that a global communication network, such as the Internet, is not required to practice other embodiments of the invention. A locally provided and maintained communication network may be used in an embodiment of the invention.

Continuing with FIG. 1, the set top box 152 can include a transceiver 157, such as an infrared (IR) or radio frequency (RF) transceiver, that can exchange signals with a remote control unit 158 or other user input device. The set top box 152 can be a component that is separate from the television set 154 as shown in FIG. 1, or its features can be built into circuitry of the television set 154 (e.g., an interactive television set). The set top box 152 enables a viewer to select television programming content to view and then delivers the television programming content to the television set 154. A storage unit 162 can also be coupled to or be a part of the set top box 152. The storage unit 162 can include a machine-readable storage medium such as a cache, buffer, memory, diskette, compact disk, tape, or the like and their associated hardware, in one embodiment. In another embodiment, the storage unit 162 can include a video cassette recorder (VCR). In another embodiment, the storage unit can include a hard disk such as a digital or personal video recorder (DVR or PVR).

As noted above, the local studio 106 can insert additional programming content into the received transmission, for example, to provide cable content that includes locally provided channels. The programming content is then distributed to customers over the cable network 134. In addition to local programming content insertion, the local studio 106 can insert advertising content. Product supplemental information relating to the advertising for participating merchants 122 can also be inserted. Product supplemental information can include information relating to the goods or services being advertised in the commercial. In addition to goods and services, coupons and other information services can be made available to the viewer, which in one embodiment can be obtained via the merchant's 122 web site 124 on the Internet. Triggers, such as Advanced Television Enhancement Forum (ATVEF) triggers, which are related to the web site 124 and/or to its contents, can be continuously updated as the television broadcast is being received.

As noted above, the triggers, resources, or announcements can be inserted by the originating broadcaster 104, a local broadcaster 106, or by the cable system operator 108.

Figure 2:
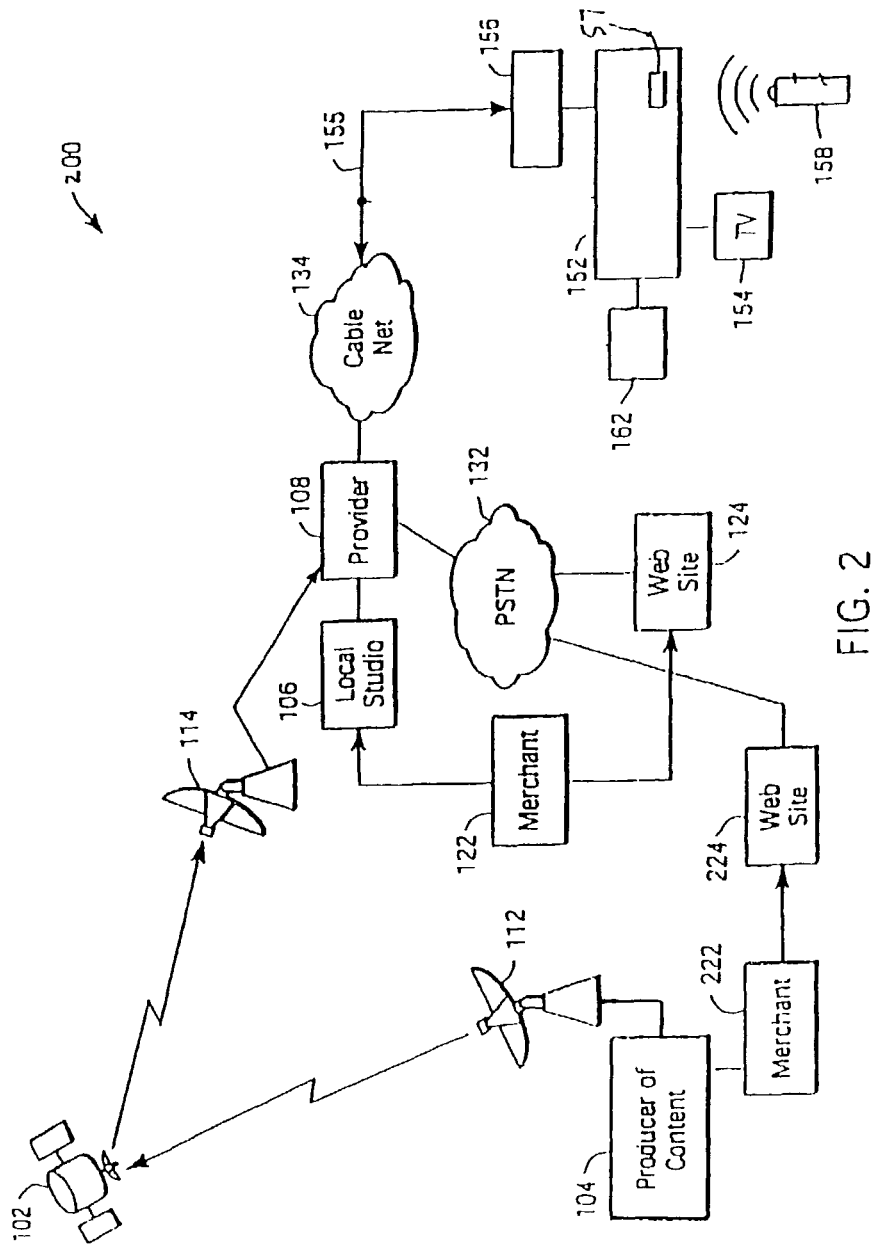
FIG. 2 is a block diagram of another interactive video casting system that can implement an embodiment of the invention.

FIG. 2 is another block diagram showing an example of an interactive video casting system 200 and illustrates another point of insertion of the product supplemental information. In a specific embodiment shown in FIG. 2, a merchant 222, operating a web site 224, is located such that the merchant 222 is capable of inserting commercial prior to the uplink transmission to the satellite 102.

As noted above, Internet access is not necessary to practice the invention. A locally provided network may, for example, be used to practice an embodiment of the invention. The cable provider 108 can supply the foregoing features, for example, by providing a web site or "walled garden" that is accessed by its subscribers. In such a case, the cable provider 108 serves as an intermediary and submits the purchases to the actual merchants 122 or 222.

In another embodiment, programming content and/or other data may be distributed to a subscriber/customer via a satellite TV delivery system, which may include a direct broadcast satellite (DBS) system. A DBS system may include, for example, a small 18-inch satellite dish (which is an antenna that can receive a satellite broadcast signal); a digital integrated receiver/decoder (IRD), which separates each channel, and decompresses and translates the digital signal so that a television can show the digital signal; and a remote control that transmits command signals. Programming for a DBS system may be distributed by, for example, multiple high-powered satellites in geo-synchronous orbit, with each satellite having multiple transponders. Compression (e.g., Moving Pictures Experts Group or MPEG based compression) may be used to increase the amount of programming content that can be transmitted in the available bandwidth.

A digital broadcast center may be used to gather programming content, ensure the digital quality of the programming content, and transmit the signal up to the satellites for delivery. Programming content may be provided to the broadcast center from content providers (e.g., ABC, CNN, ESPN, and so on) via satellite, fiber optic cable, and/or special digital tape. Satellite-delivered programming content are typically immediately digitized, encrypted, and up-linked to the orbiting satellites. The satellites re-transmit the signal back down to every earth-station (or, in other words, every compatible DBS system receiver dish at, for example, homes and businesses of customers).

Some programming content may be recorded on digital videotape in the broadcast center, and the programming content can be broadcast at later time or day. Before any recorded programming content are viewed by customers, L* technicians may use post-production equipment to view and analyze each tape to, for example, ensure audio and video quality. Tapes may then be loaded into, for example, a robotic tape handling system, and playback may be triggered by a computerized signal sent from a broadcast automation system. Back-up videotape playback equipment may ensure uninterrupted transmission at all times.

Figure 3:
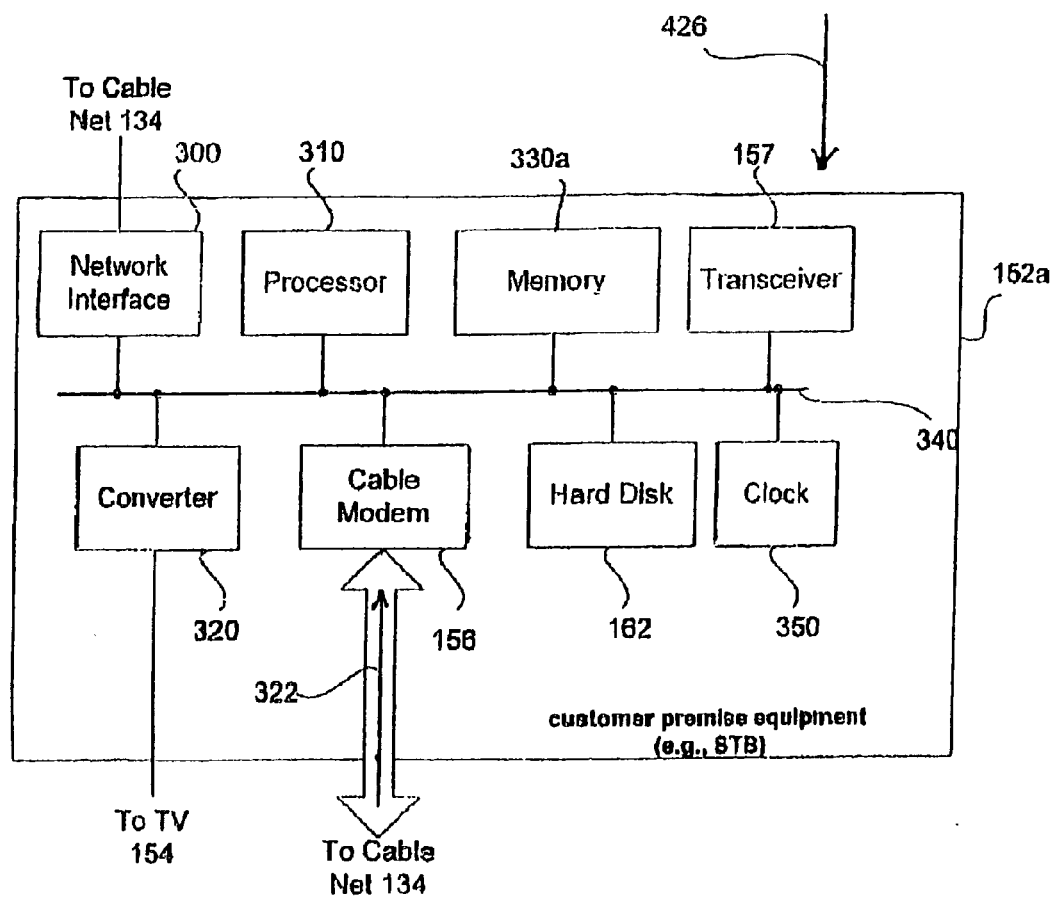
FIG. 3 is a block diagram of a customer premise equipment, such as a set top box, according to an embodiment of the invention.

FIG. 3 illustrates a block diagram of a representative set top box (or other suitable customer premise equipment or processing device) 152a according to a specific embodiment of the invention. It is noted that the STB 152a described below is one of the possible embodiments of the STB 152 that is shown in FIG. 1 and FIG. 2. It is further noted that the components shown in FIG. 3 may be implemented in other types of customer premise equipment or other types of processing devices. In an embodiment, the STB 152a includes a network interface 300, processor 310, memory device 330a, transceiver 157, converter 320, cable modem 156, optional clock 350, and hard disk 162 (which may be any suitable storage device), all interconnected together for communication via a system bus 340. For purposes of explaining the functionality of the invention, other known components or modules or software in a set top box have been omitted in FIG. 3. Network interface 300 connects the STB 152a to the cable network 134 (FIG. 1). In an alternative embodiment, the cable modem 156 or the converter 320 may provide some or all of the functionality of the network interface 300, and thus, the network interface 300 may be omitted. In another embodiment, the network interface 300 may also provide some or all of the functionalities of the converter 320 and cable modem 156, and as a result, the converter 320 and/or cable modem 156 may be omitted in this particular embodiment. Thus, the channels shown in FIG. 3 (e.g., channel 322) may be coupled to the cable modem 156 and/or to the network interface 300.

The processor (controller) 310 executes instructions stored in memory 330a, which will be discussed in further detail in conjunction with FIG. 4. The processor 310 also typically performs other management functions of the STB 152a.

The transceiver 157 can include an infrared (IR) or radio frequency (RF) transceiver (or other transceiver types) that can exchange signals with the remote control unit 158 (FIG. 1 or FIG. 2) or other user input device. The converter 320 can convert, if necessary, digitally encoded broadcasts to a format usable by the television 154 (FIG. 1 or FIG. 2). In addition, the converter 320 can convert other data received in an out-of-band portion of a broadcast, such as television scheduling information to a format that can be stored in the memory 330a or hard disk 162.

The cable modem 156 can transmit and receive digital information, such as television scheduling information, if not included in the out-of-band portion of a broadcast. In alternative embodiments, the cable modem 156 may be a conventional modem for use over telephone lines or may include any other component or module for transmitting and receiving digital data.

The STB 152a may include the hard disk 162 or, in an alternative embodiment, the hard disk 162 may be external to STB 152a. For example, in one embodiment, a PVR (not shown) may include the hard disk 162 and may be coupled to the STB 152a. The hard disk 162 may store television programming content in MPEG format or other format or combination of formats.

Figure 4:
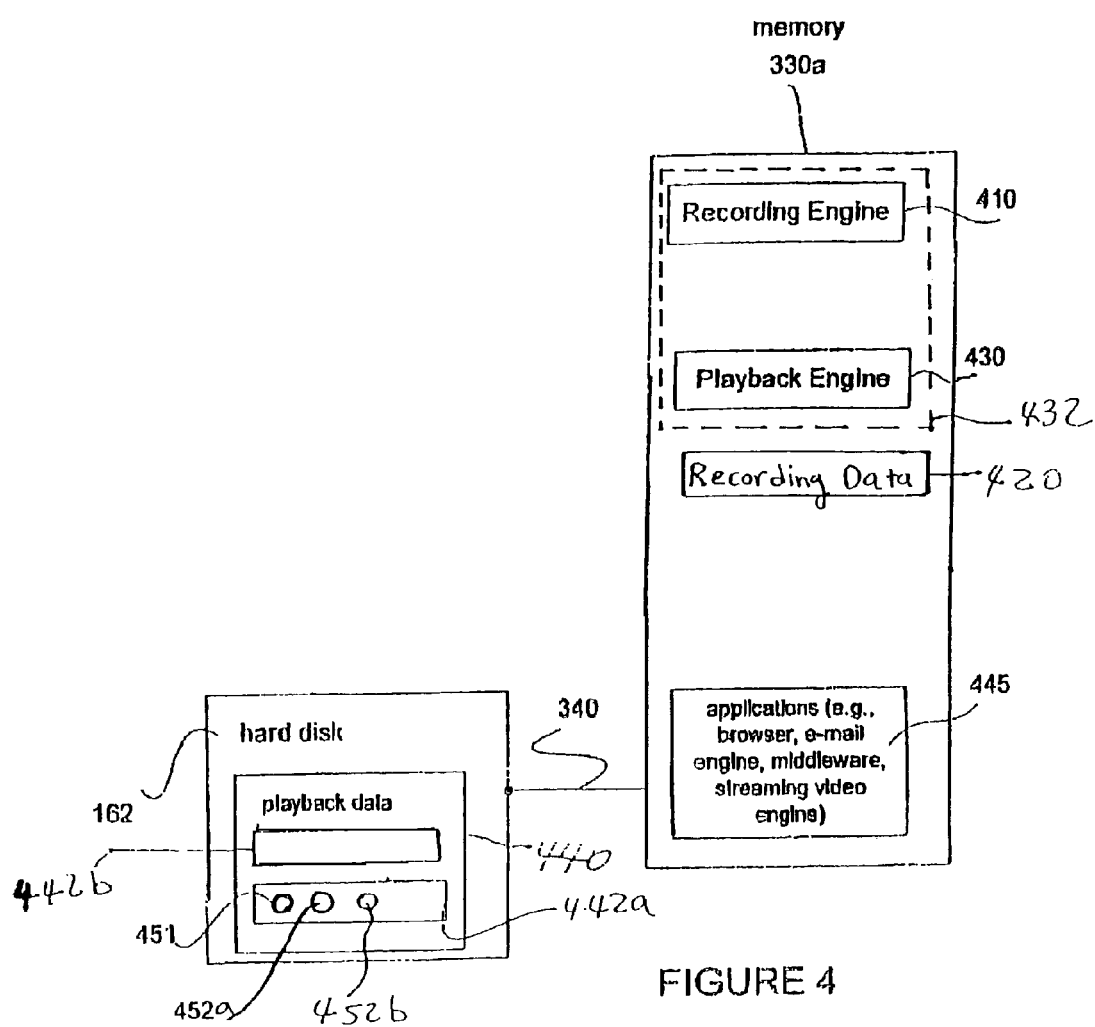
FIG. 4 is a block diagram of a memory device of the customer premise equipment of FIG. 3.

The optional clock 350 is typically a digital clock for use with the engines that can be stored in the memory device 330a (see FIG. 4). The clock 350 can be updated regularly by using the cable modem 156 to contact an online clock, such as the Atomic Clock at the U.S. Naval Observatory, or to contact a head-end at the provider 108 so that the clock 350 is synchronized with the clock of provider 108. Alternatively, the clock 350 may be set manually by a viewer or may be updated through other methods known to those skilled in the art.

FIG. 4 is a block diagram of a memory device 330a in the STB 152a (FIG. 3). In the specific embodiment shown in FIG. 4, the memory device 330a includes a recording engine 410; recording data 420; playback engine (or viewing engine) 430; playback data 440; and applications 445. The various engines discussed herein may be, for example, software, commands, data files, programs, code, modules, instructions, or the like. It is also understood that the various engines described herein may be combined. For example, the recording engine 410 and playback engine 430 may be combined as a substitute content engine 432. Furthermore, the various engines (e.g., applications 445) described herein may reside in other storage devices such as hard disk 162.

The recording engine 410 may enable a viewer to schedule a "season's pass" recording schedule, i.e., to record specific programming content on a daily or other regularly scheduled basis. The recording engine 410 may also enable a viewer to schedule the recording of a particular programming content at a specific day/time. The programming content may be received by the STB 152a via, for example, the cable net 134.

The recording engine 410 then can record the programming content onto the hard disk 162 in MPEG format or other format for later viewing on the television 154.

The recording data 420 includes viewer-specified recording instructions for the recording engine 410, such as the particular channel(s) to record, the time/day to start recording, and the length of the recording time and/or the time to stop recording. The playback engine 430 sends the recorded programming content to the converter 320 to convert to a format capable to be displayed on the television 154, if necessary. The playback engine 430 may also convert the programming content into a format displayable by the television 154 depending on the capabilities of the converter 320.

In one embodiment, upon receiving a user-enabled command signal 426 (e.g., from the user-controlled remote control device 158), the playback engine 430 can set the substitute content 442 (see FIG. 5A) in place of the currently displayed live programming content or buffered programming content as shown on the screen 444 of the television 154. Of course, the user can enable the command signal 426 by directly actuating a button or switch on the set top box 152a, instead of using, for example, the remote control device 158. In another embodiment, commercial breaks in the currently displayed live or buffered programming content are automatically detected by the playback engine 430, and the substitute content 442 is automatically displayed during the commercial breaks and paused (or removed from the screen 444) when the commercial break ends and the main program in the broadcast resumes. Commercial breaks in the live or buffered programming content can be detected by having the set top box 152a monitor for triggers or tags that demarcate commercial breaks.

More than one substitute content 442 may be displayed by the playback engine 430. The substitute content 442 can be a previously-recorded programming content (e.g., advertisements, news, movies, and/or other types of shows) as recorded by the recording engine 410, live programming content as selected on a particular channel by the playback engine 430, or content from an Internet Protocol channel, such as streaming video, electronic mail interaction, and so on. The electronic mail interaction would be automatically activated during, for example, commercial breaks and de-activated (or halted) during the non-commercial segments in the live or buffered programming content. The substitute content 442 may be, for example, stored content as specified by the user, may come from a selected channel as specified by the user, may be content from a default channel, and/or may be stored content that is chosen by default by the playback engine 430. As described below with reference to FIG. 11A, the substitute content 442 may also be content from an aggregated content collection that is based upon a criteria selected by the viewer.

Figure 5A:
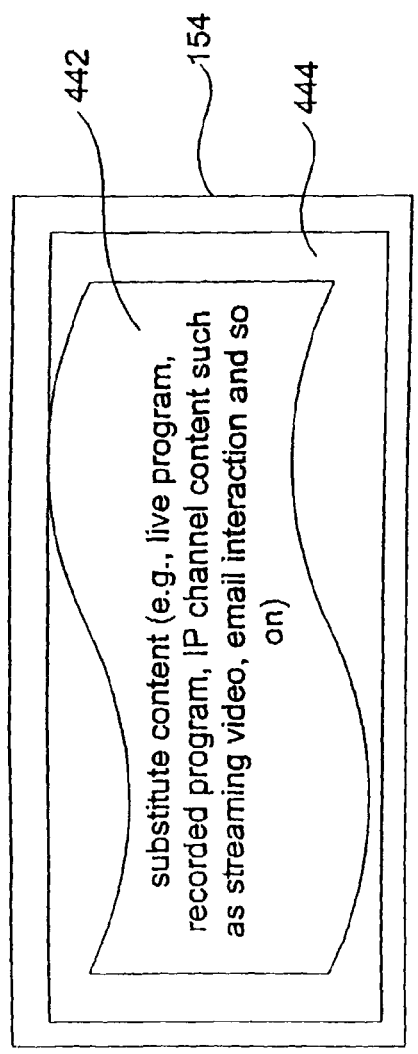
FIG. 5A is a block diagram of a television screen where the substitute content is shown as a full screen view across the television screen.
Figure 5B:
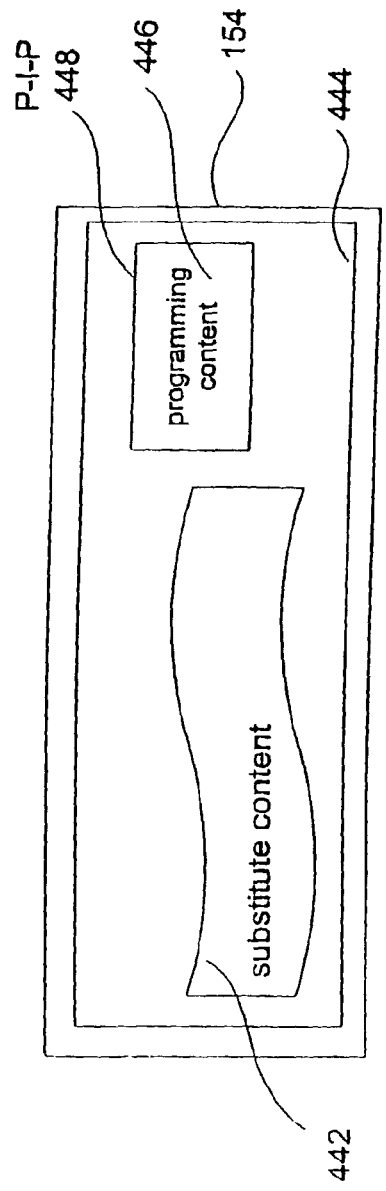
FIG. 5B is a block diagram of a television screen where the substitute content is shown as the main screen view, while the programming content is shown as a picture-in-picture.
Figure 5C:
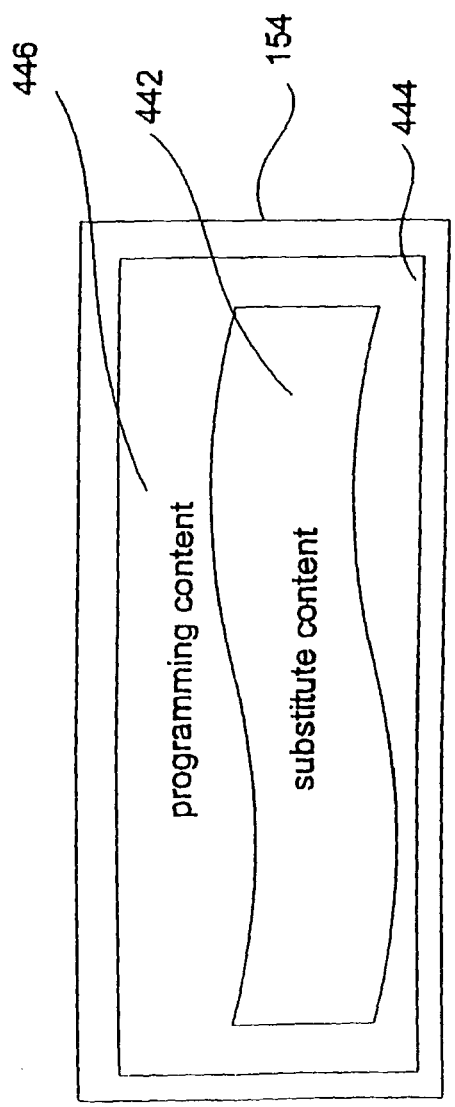
FIG. 5C is a block diagram of a television screen where the substitute content is shown on the television screen foreground, while the programming content is shown on the television screen background.

In another embodiment, the substitute content 442 is displayed for a particular amount of time (e.g., 30 seconds) by the playback engine 430 after a commercial break occurs in the programming content 446 currently displayed on the television screen 444 (see, e.g., FIG. 5C).

In another embodiment, the substitute content 442 is displayed during breaks in a video telecast or teleconference (where a teleconference may be, for example, a Remote Learning Session or Video Conference) that are shown in the television screen 444. A break in a live action in a video telecast or teleconference may occur, for example, when there is a change in speakers, during the time when equipment is set up, during unforeseen delays in the presentation, during broadcast stoppage, and so on.

Thus, an embodiment of the invention advantageously permits the user to view one or more substitute content 442 on the television screen 444 during commercials and/or other breaks (e.g., broadcast stoppage) in a currently-shown live broadcast content or buffered broadcast content. The user can, therefore, optimize his/her viewing time by viewing other content when a break occurs in a currently-shown live broadcast content or buffered broadcast content.

An embodiment of the invention also advantageously enables an alternative medium for showing advertisements, since the substitute content 442 can also include advertisements. The advertisements in the substitute content 442 can be shown during commercial breaks of a currently shown broadcast content, during the skip segment (e.g., a 30-second skip segment) of a buffered broadcast where the skip segment contains recorded advertisements in the buffered broadcast, or during other breaks in a current broadcast content.

The playback engine 430 may also have the functionality of a display engine for showing the images on the screen 444 (see FIG. 5A) of the television 154 in various formats. For example, the substitute content 442 may be displayed in full screen mode on the television screen 444, as shown in FIG. 5A, while the current programming content is removed from the screen 444.

Alternatively or in addition, as shown in FIG. 5B, the playback engine 430 may display the substitute content 442 as the main screen 444 view, while displaying the live or other programming content 446 as a picture-in-picture 448 on the television screen 444. Of course, the substitute content 442 may alternatively be displayed in the picture-in-picture 448, while the programming content 448 is displayed as the main screen 444 view.

Alternatively or in addition, as shown in FIG. 5C, the substitute content 442 may be displayed as a picture overlay on the television screen 444 foreground, while the live or other programming content 446 is displayed on the television screen 444 background.

Figure 5D:
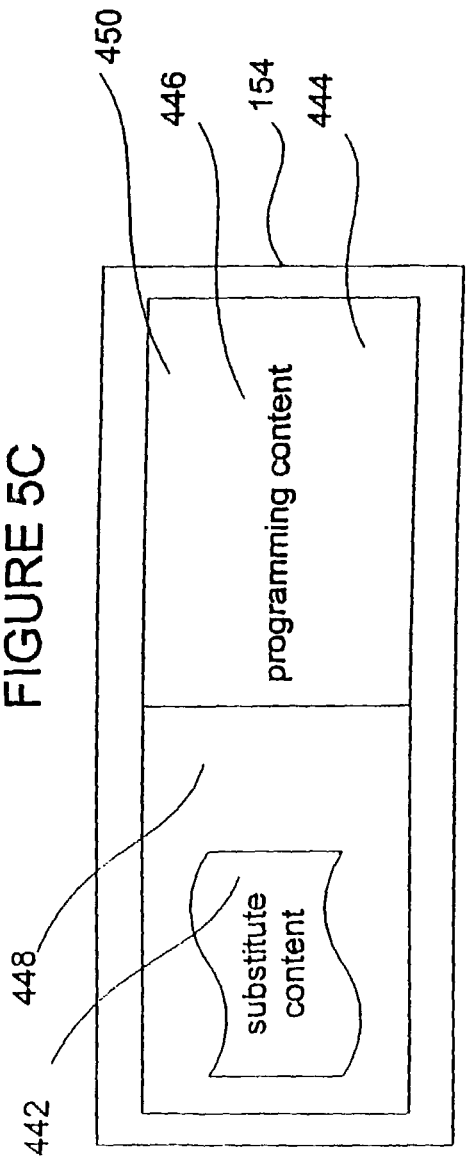
FIG. 5D is a block diagram of a television screen where the substitute content is shown on one portion of a split screen view, and the programming content is shown on another portion of the split screen view.

Alternatively or in addition, as shown in FIG. 5D, the substitute content 442 and the live or other programming content 446 may be displayed in separate areas 448 and 450, respectively, as, for example, split screen views on the television screen 444.

Prior to sending the substitute content 442 from the hard disk 162 (or via a selected broadcast channel as graphically represented by line 322), the substitute content 442 is typically decoded by the converter 320 (FIG. 3) prior to displaying the substitute content 442 on the television screen 444. Similarly, prior to displaying the programming content 446 on the television screen 444, the programming content 446 is typically decoded by the converter 320.

Referring again to FIG. 4, the memory 330a may also store applications 445 which may represent one or more application. The applications 445 may also be stored in the digital storage device 162. The applications 445 may include, for example, a browser for accessing a Uniform Resource Locator (URL) address on the Internet and for permitting web pages in a URL address to be displayed on the television screen 444. The applications 445 may also include an e-mail engine that can detect when an e-mail message has been received by the set top box 152a. The email engine can also permit the display of an e-mail message on the television screen 444, the creation and transmission of an e-mail message from the STB 152a, and/or other e-mail processing functions. The applications 445 may also include a streaming video engine for processing streaming video that is received from an IP channel.

The applications 445 may also include middleware (sometimes called "plumbing") for connecting two sides of an application and passing data between them.

The playback data 440 may be stored in, for example, the hard disk 162 and include a list of recorded substitute content 442 (e.g., substitute contents 442a and 442b. The playback engine 430 determines the user-selected substitute content 442 to be displayed on the television screen 444 in response to a user-enabled command 426 (e.g., provided by a user via a remote control device) or in response to the detection of a break in the currently-shown programming content 446.

The playback data 440 may also include a tag 451 (FIG. 4) identifying a specific recorded substitute content to be displayed as the default substitute content in response to user-enabled commands 426 or in response to the detection of a break in the currently-shown programming content 446. Thus, the default substitute content may also be displayed automatically when a commercial break is detected in the currently displayed programming content. Detection of commercial breaks in a programming content is performed by, for example, detecting identifiers that identify the beginning and end of a commercial. Various methods or mechanisms can be used to identify a sequence, such as, for example, include MPEG methods that multiplex special data stream(s) into the digital video transport stream, encoding/embedding data in the vertical blanking interval (VBI) portion of the analog television video signals (e.g., ATVEF triggers), using out-of-band modems (e.g., Digital Audio-Visual Council or "DAVIC" modems) to provide the interactive content, and other such techniques that provide information related to the content of the television signals. Another method to identify breaks in the programming content is by scanning the closed caption text in the programming content for keywords that are of interest to the user. This method can be used to determine the beginning and ending of break segments. For example, a local new broadcast can be broken into "headlines", prominent local stories, national news, international news, business news, human interest stories, sports, weather, and commentary. A user may elect to skip the sports or weather section (especially an interactive user that receives these content on-demand) and to use this segment time to view buffered content (i.e., substitute content).

Further, the playback data 440 may also include tags 452 indicating the portions of a recorded substitute content that have been shown by the playback engine 430 for viewing on the television screen 444. The tags 452 thus permits the playback engine 430 to skip the showing of previously shown substitute content. Thus, as an example, the user may be viewing a first program (e.g., programming content 446) on the screen 444. When a commercial break occurs in the first program, the end user may initiate a second program (e.g., substitute content 442) to be displayed on the television screen 444. As discussed above, the user may reduce the first program into, for example, a picture-in-picture 448 and bring the second program on the main window of screen 444. When the commercial break in the first program comes to an end, the user can perform a swap function to bring the first program from the picture-in-picture 448 to the primary focus on the screen 444. In one embodiment, the second program will pause, and the tags 452 can be placed by the playback engine 430 (FIG. 4) at the segment where the second program is paused. The user can then resume viewing of the second program (based on the tag 452 location) during the next set of commercials. Of course, other types of pause features or techniques may be used to indicate where the second program (substitute content) is paused.

In one embodiment, a live programming content (such as content 446) may also be continuously recorded (e.g., in a live program buffer in hard disk 162) while the viewer is viewing the substitute content (e.g., substitute content 442). Thus, if a commercial break occurs in the live programming content, the viewer can switch viewing to the substitute content while the recording engine 410 records the live programming content. The live programming content may be, for example, recorded automatically (as programmed by the user) or upon receiving user-enabled commands from, for example, a user-controlled remote control device 158. If the commercial break (in the live programming content) ends before the viewer finishes watching at least a segment of the substitute content 442, then the following compensation may occur. When the viewer switches viewing from the substitute content back to the programming content 446, the user can, for example, issue via remote control device 158 a replay or rewind command so that the recorded portion of the live programming content is rewound to permit the user the opportunity to view the missed portions of the live programming content. Since the live programming content may be buffered in a live program buffer, the viewer can view the remaining segments of the live programming content after watching the missed recorded portions of the live programming content. Alternatively or in addition, the live program can be paused after the end of the commercial segment.

Figure 6:
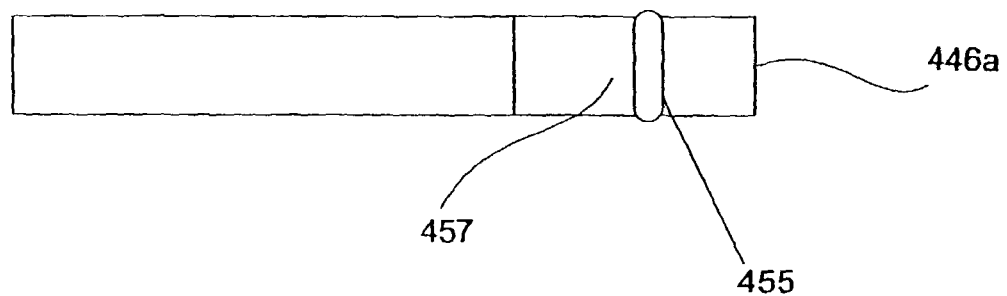
FIG. 6A is a block diagram of a programming content that includes a disable feature to prevent disruption of the viewing of commercial segments in the programming content.
FIG. 6B is a flowchart of a method of preventing the viewing of substitute content during program breaks.
FIG. 6C is a flowchart of a method of permitting a user to view substitute content during program breaks.

FIG. 6A is a block diagram of a programming content 446a with a disable feature to prevent the disruption of viewing of commercial segments in the programming content 446a. For example, an advertiser can pay the broadcaster extra fees (or rates) on the rate card to insert tags 455 prior to a commercial segment 457. The tag 455 deactivates the playback engine 430 so that the viewer will not be able to view the substitute content 442 when the commercial segment 457 is showing on the television screen 444. As a result, an advertiser can pay extra rates to the broadcaster to insure the viewing of the commercials of the advertisers to consumers.

Figure 6B:
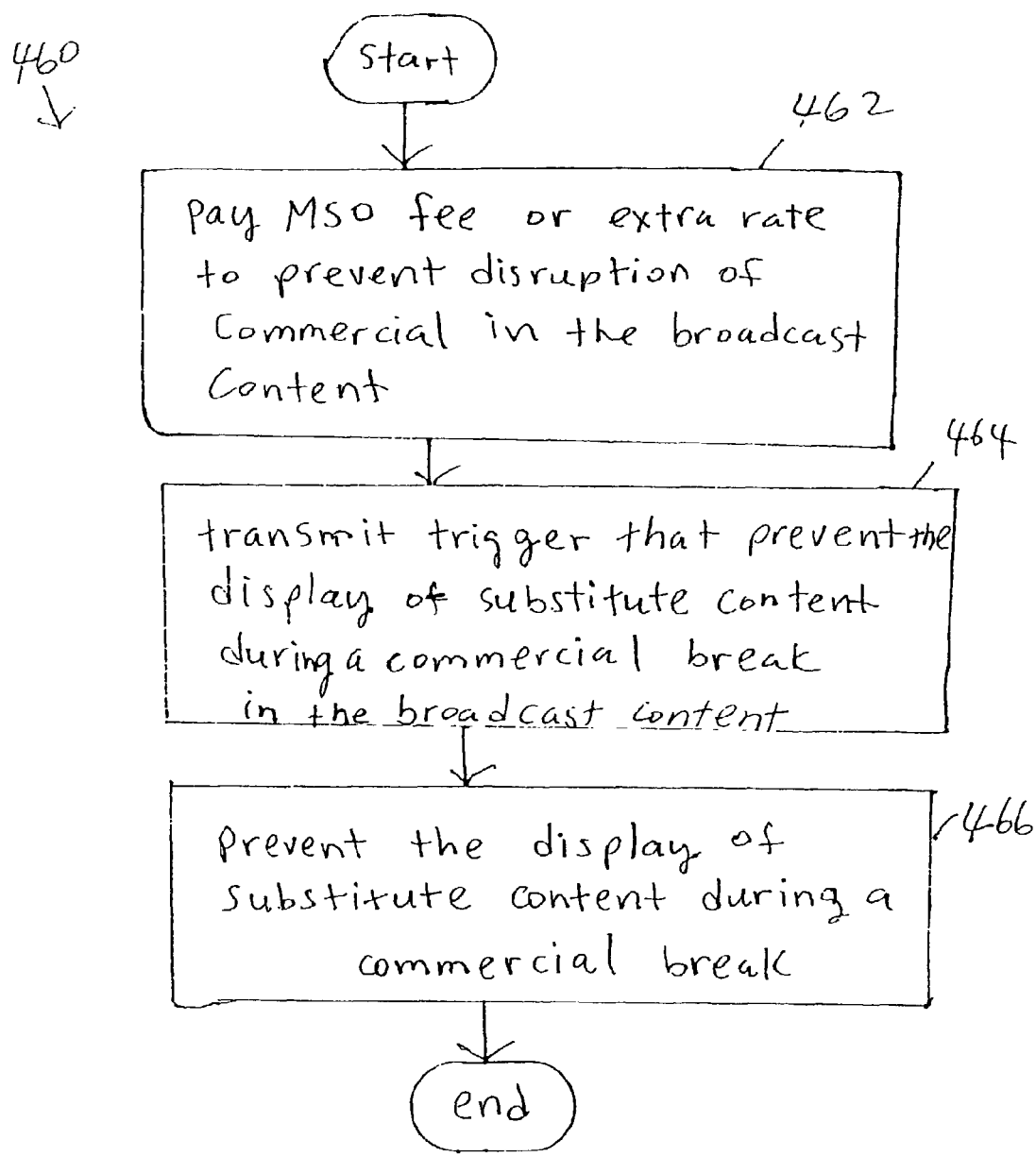

FIG. 6B is a flowchart diagram illustrating a method 460 of preventing the disruption of viewing of commercial segments in the programming content 446a. An advertiser or broadcaster (or other party) may pay (462) a multiple system operator (MSO) a fee or extra rate to prevent disruption of a commercial in the broadcast content. The fee or extra rate enables triggers or tags that prevent s subscriber to view substitute content during a commercial break in the broadcast content. The advertiser (or broadcaster or other party) transmits (464) a trigger that prevents the display of substitute content during a commercial break in the broadcast content. For example, the trigger or tag may prevent an overlay with substitute content from being displayed during the commercial break. As a result, the display of a substitute content is prevented (466) during a commercial break. The method 460 permits the MSO to obtain additional revenues from the fee (or extra rate) paid by an advertiser (or broadcaster), and permits an advertiser to prevent disruptions of commercials.

Figure 6C:
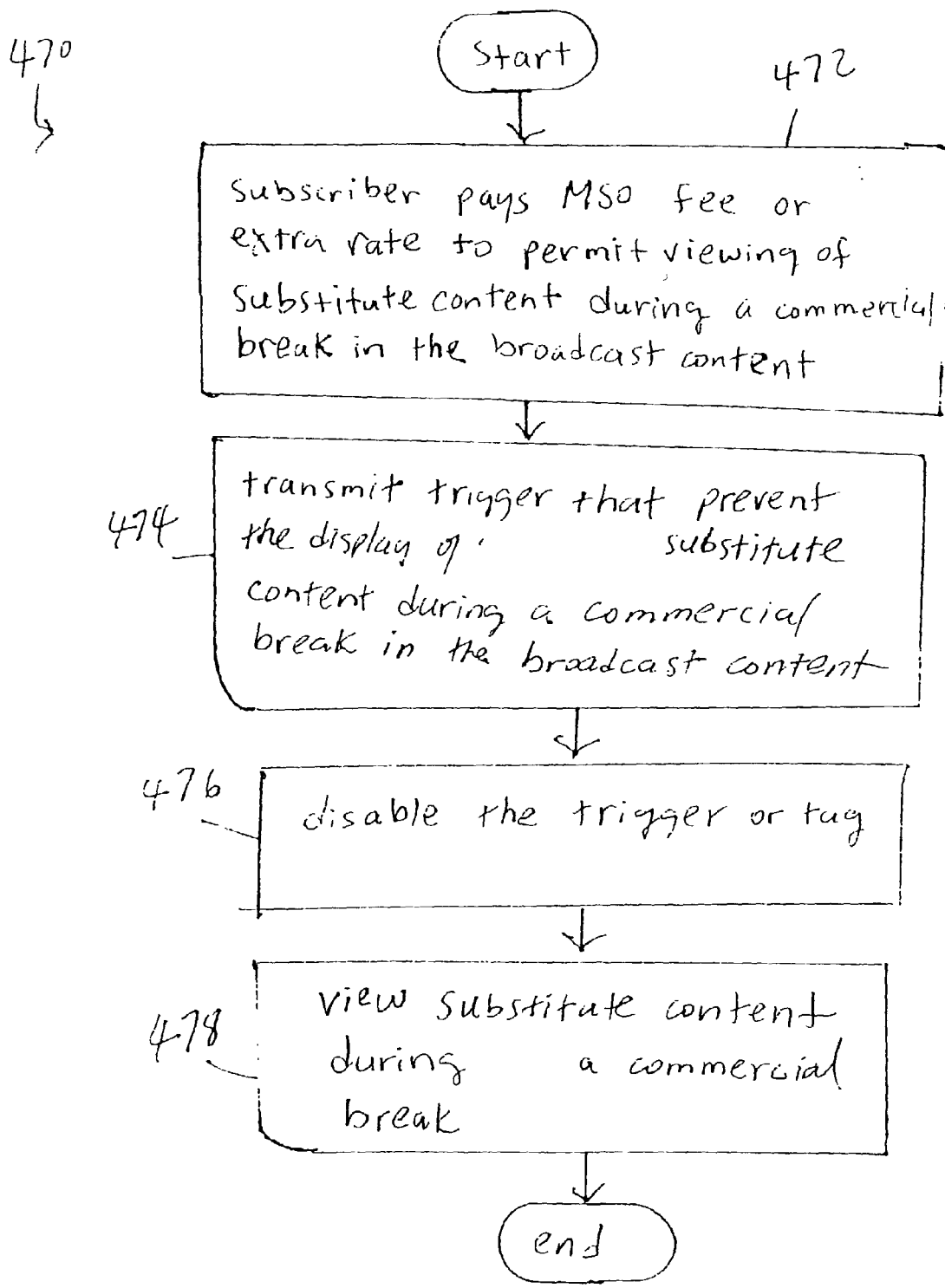

FIG. 6C is a flowchart diagram illustrating a method 470 of permitting a subscriber to view substitute content during a commercial segment in the programming content 446a. A subscriber may pay (472) a multiple system operator (MSO) a fee or extra rate to permit the subscriber to view substitute content during a commercial in the broadcast content. The advertiser (or broadcaster or other party) transmits (474) a trigger that prevents the display of substitute content during a commercial break in the broadcast content. For example, the trigger or tag may prevent an overlay with substitute content from being displayed during the commercial break. The subscriber can disable (476) the trigger or tag that prevents the display of substitute content. As a result, the subscriber may view (478) a substitute during a commercial break. The method 470 permits the MSO to obtain additional revenues from the fee (or extra rate) paid subscriber, and permits a subscriber to view substitute content during commercial breaks.

Thus, the tags 455 (FIG. 6A) may work in cooperation with an MSO and/or subscriber authorization features to enable/disable the effectiveness of the tags 455. As mentioned above, a subscriber who pays an additional fee may be able to disable the tags 455 so that the subscriber can view substitute content during breaks in the programming content. An advertiser or broadcaster can pay (462) a fee or extra rates to an MSO to prevent the display of substitute content during a commercial break in a broadcast content or to prevent other disruptions of commercials in the broadcast content.

Figure 7:
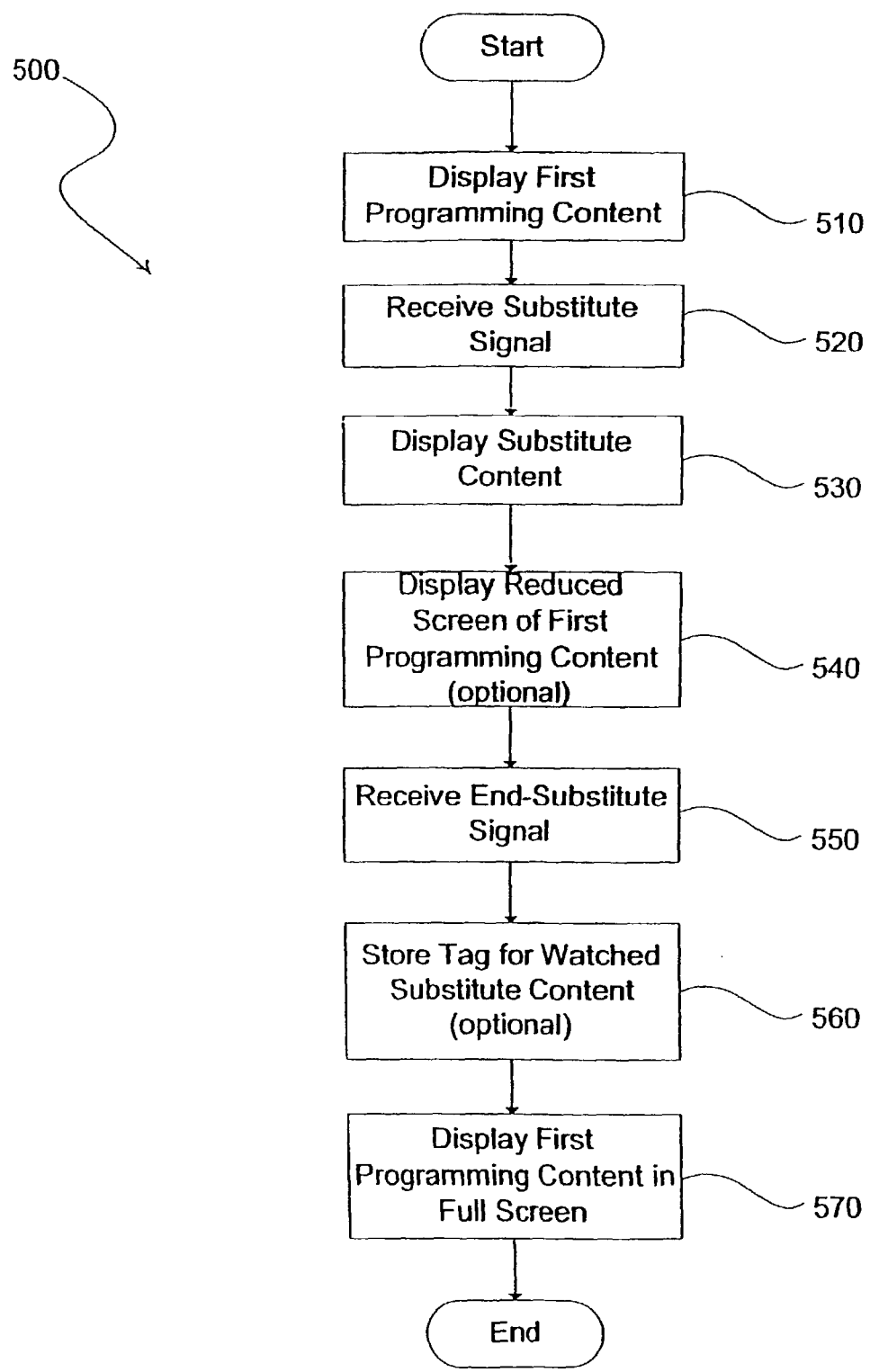
FIG. 7 is a flowchart of a method for substituting a live or pre-recorded (buffered) programming content with substitute content, in accordance with an embodiment of the invention.

FIG. 7 is a flowchart diagram of a method 500 for substituting a substitute content in place of a live or pre-recorded programming content as shown on, for example, a television screen 444. In one embodiment, the playback engine 430 (FIG. 4) may perform the method 500. The method 500 may run continuously or at representative intervals. Further, multiple instances of the method 500 may run simultaneously. A first programming content is displayed (510) on, for example, the screen of the television 154 or other display device. The first programming content may be a live programming content, buffered programming content, or other programming content, such as a video telecast, teleconference, or prerecorded programming content. Next, a substitute signal is received (520). The substitute signal may be received by the STB 152a from, for example, a remote control device or other device, such as the remote control device 158. Typically, a viewer will send the substitute signal via the remote control device 158 upon viewing a commercial on the television 154. However, the viewer may also send the substitute signal at any time, such as when live action takes a break between speakers in a teleconference. In another embodiment of the invention, the substitute signal is a tag in the broadcast, indicating the start of a commercial.

In one embodiment, the substitute signal may be ignored if a commercial contains a signal, such as a particular tag, indicating that the viewing of the commercial in the programming content should not be disrupted. For example, this enables an advertiser, upon payment of an extra fee, to prevent skipping of commercials or substitution over commercials.

Next, the substitute content is displayed (530). In an embodiment of the invention, the playback engine 430 selects the substitute content from the hard disk 162 for viewing based on the playback data 440. For example, if there is multiple substitute content on the hard disk 162, then the playback engine 430 can select a default programming content or pre-specified substitute content as indicated in data 440. Further, if a portion of the substitute content has already been viewed, as indicated by a tag (tags 452a & 542b in FIG. 4) in the data 440, then the playback engine 430 will begin displaying the substitute content starting from the end of the previously viewed content portion. In another embodiment of the invention, the playback engine 430 enables a viewer to select a substitute content to view from a list of substitute content in the playback data 440 upon receipt of a substitute signal. In another embodiment, the playback engine 430 selects substitute content including a live program that is transmitted along a specified channel. In another embodiment, the playback engine 430 selects substitute content including IP channel content such as streaming video, e-mail interaction, and so on. The IP channel content may be received by the STB 152a, for example, via the cable net 134.

While the substitute content is being displayed (530), a small window may also be optionally displayed (540) showing a reduced view of the first programming content, thus enabling a viewer to monitor the status of the first programming content. For example, if a viewer sends a substitute signal to avoid watching commercials, the viewer will want to return to view the first programming content after the end of the commercials. In one embodiment, the first programming content may also be continuously recorded by recording engine 410 while viewing the substitute content. Of course, the first programming content may also be completely removed from the screen when the substitute content is being shown on the screen.

In another embodiment, only the replayed segment of a sports broadcast are recorded by recording engine 410 or tagged by playback engine 430. To determine the replayed segment, various methods may be used such as detecting for a signal difference that characterize the replayed segment, or comparing the replayed segment with a prior recorded content stored in a buffer. Typically, many people are probably only interested in highlights (e.g., great plays in a baseball game) which are replayed in, for example, a sports news program.

In another embodiment, the close caption of a live programming content (e.g., a sports news show) is watched by the viewer while the viewer is watching a pre-recorded or streaming content to view a highlight (e.g., a great play in a baseball game).

In another embodiment of the invention, a countdown timer may be displayed in addition to or as an alternative to the small window. The countdown timer may count down in 30-second increments, indicating the end portion of successive 30-second commercials. The viewer can then pause or halt the substitute content and continue viewing the first programming content on the screen.

Next, an end-substitution signal is received (550). In an embodiment of the invention, the remote control device 158 can send the end-substitution signal to the STB 152a. In another embodiment of the invention, a tag in the programming content may indicate the end of a commercial or the restart of the non-commercial segment in the programming content. Tags 452a and 452b may then be stored (560) in, for example, the playback data 440, marking the portion of the substitute content that has been viewed. In an embodiment of the invention, the playback engine 430 stores the tags 452a and 452b. The first programming content is then displayed (570) in full screen on the television 154 by, for example, the playback engine 430. In addition, the substitute content may be displayed in a small window in reduced size and in a paused mode.

Figure 8:
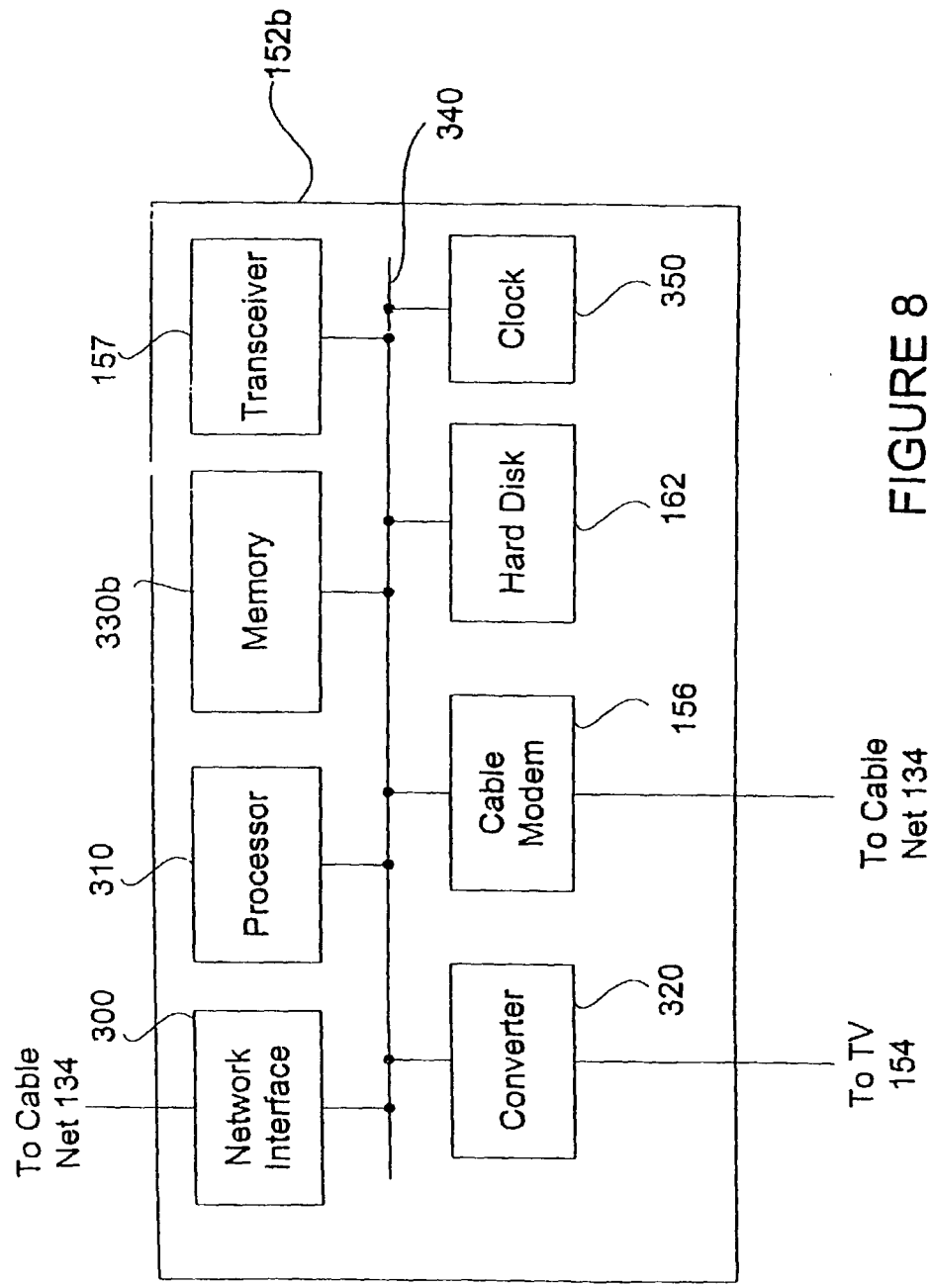
FIG. 8 is a block diagram of another representative customer premise equipment, such as a set top box, according to an embodiment of the invention.

FIG. 8 illustrates a block diagram of another representative set top box (or other customer premise equipment or processing device) according to a specific embodiment of the invention. The STB 152b includes a network interface 300, processor 310, memory device 330b, transceiver 157, converter 320, cable modem 156, clock 350, and hard disk 162 (also referred to as storage device 162), all interconnected together for communication via system bus 340. In one embodiment, the components of STB 152b, except for at least some of the programming content in the memory device 330b, may be substantially similar to corresponding components in the STB 152a. The processor (controller) 310 executes instructions stored in the memory 330b, which will be discussed in further detail in conjunction with FIG. 10.

Figure 9:
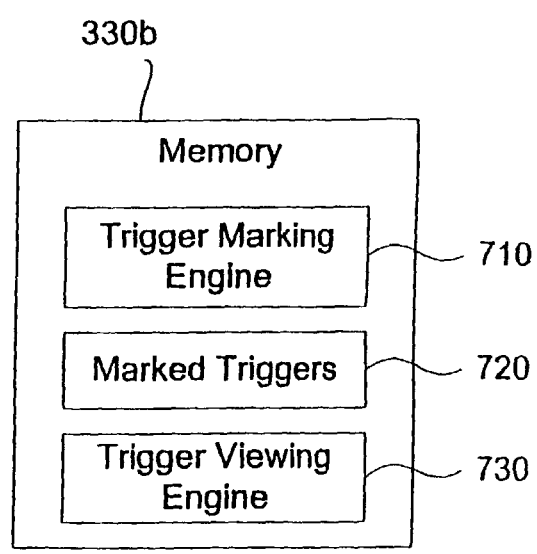
FIG. 9 is a block diagram of a memory device of the customer premise equipment of FIG. 8.

FIG. 9 is a block diagram of a memory device 330b of the STB 152b (FIG. 8). In one embodiment, the memory device 330b includes a trigger marking engine 710, marked triggers 720, and trigger viewing engine 730. Of course, other applications, such as the applications 445 in FIG. 4, may also be loaded in the memory 330b. Additionally, the engines 710, 720, and 730 may also be loaded into the memory 330a (FIG. 4) and may enable the below described functionalities in the STB 152a.

The trigger marking engine 710 enables a viewer to mark triggers (in a broadcast content) during television viewing for follow up viewing. In one embodiment, the trigger marking engine 710 stores the marked triggers in the marked triggers 720 where a marked trigger includes, for example, a URL address (or other address information) associated with the marked trigger. The trigger viewing engine 730 enables a viewer to later select a marked trigger and access a URL address (or other address information) associated with the selected marked trigger. Thus, when, for example, a break occurs in a live programming content (or buffered programming content, recorded programming content, or other content), a viewer can select and access a URL address in order to access the website (or other interactive site) that is linked to the URL address. Alternatively, the user may access other information linked to the selected marked trigger. The website can be shown on the television screen 444 in various formats as similarly shown, for example, by the substitute content 442 in FIGS. 5A, SB, 5C, and/or 5D, while the programming content may be removed from the screen 444 or shown as in FIGS. 5SB, 5C, and 5D during the break in the broadcast programming content. Thus, during the break, the viewer can view information and/or buy products or services from the displayed website (or other displayed information).

Figure 10:
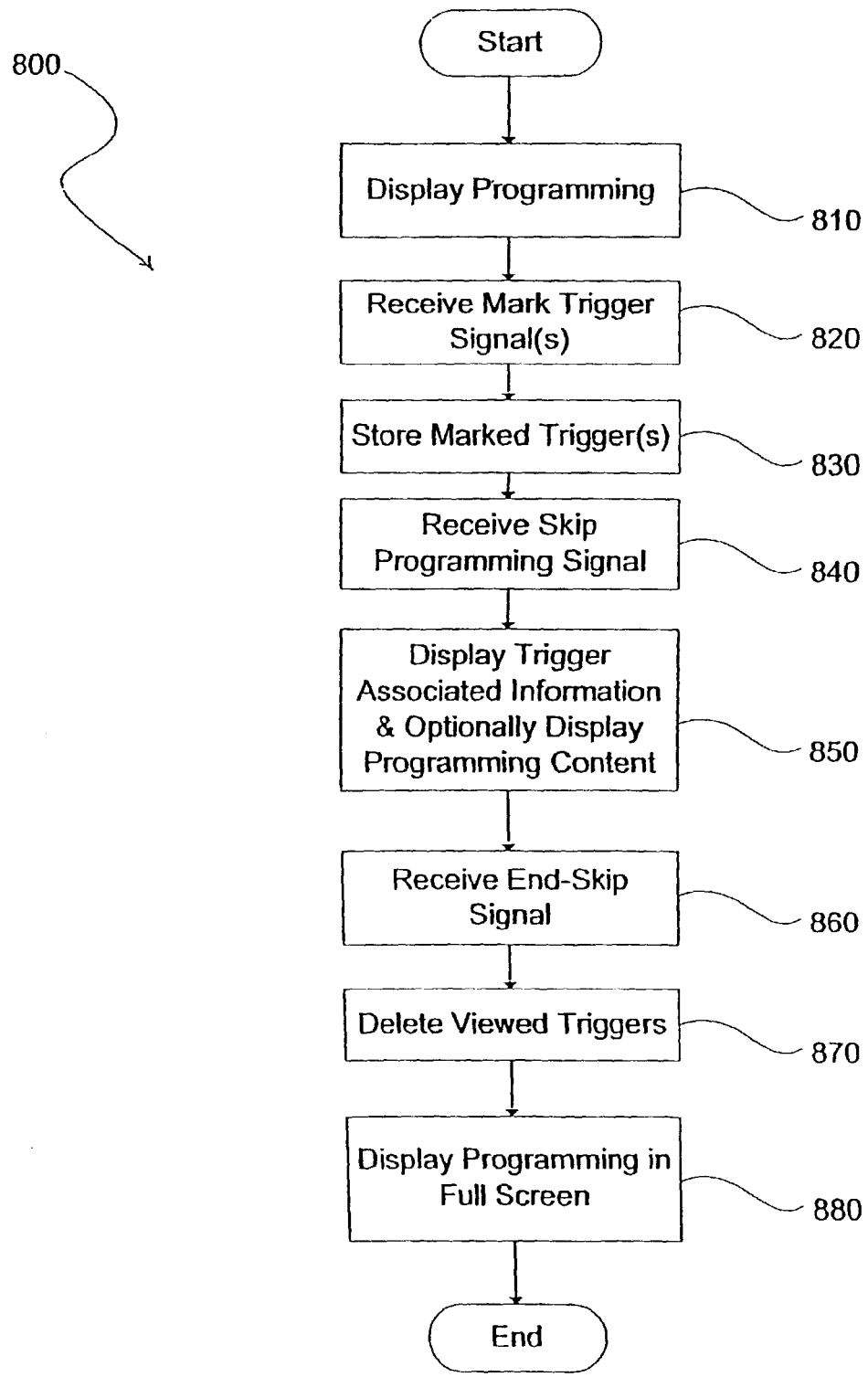
FIG. 10 is a flowchart of a method for substituting a live or other programming content with trigger-associated information, in accordance with an embodiment of the invention.

FIG. 10 is a flowchart diagram of a method 800 for substituting live programming content or other programming content with trigger-associated information. In one embodiment, the trigger marking engine 710 in conjunction with the trigger viewing engine 730 performs the operation of method 800. The method 800 may run continuously or at representative intervals. Further, multiple instances of the method 800 may be run simultaneously on a single STB.

First, a programming content is displayed (810) on, for example, the television screen 444. The programming content may include a live programming content or pre-recorded or buffered programming content. The programming content also includes triggers, which may include associated URL or other address information. The URL or other address information is simultaneously displayed on the television screen 444 with the programming content. If a viewer of the programming content is interested in the trigger, the viewer can mark the trigger by, for example, sending a command via a remote control device, such as device 158, to the STB 152b, where the command is received (820). In a single viewing session, the viewer may mark a plurality of triggers.

The marked triggers are then stored (830). In one embodiment, the trigger marking engine 710 stores the marked triggers in marked triggers 720 which may be URL or other address information. Next, a skip-program signal is received (840). If there is a single stored marked trigger, then information associated with the single trigger is displayed (850). For example, if the trigger is a website address, the website is loaded and displayed. In one embodiment, the website or information associated with the trigger is preloaded by the playback engine 430 so that when the website address is selected, the viewer during the commercial break does not need to wait for the website or information to load. If there are multiple stored triggers, then information associated with the triggers may be cycled after a pre-defined amount of time or according to viewer input. Further, a viewer may be able to select which trigger information to display from list of stored triggers. In an embodiment of the invention, the trigger viewing engine 730 displays the information associated with a trigger.

In addition to displaying information associated with a trigger, the programming content may also be optionally displayed on the television screen 444. Alternatively or in addition to displaying the programming content, a countdown timer may be displayed to indicate to the viewer when a commercial period ends. The timer may countdown in 30-second increments or other increments.

An end-skip signal is then received (860). In one embodiment of the invention, the remote control device 158 may send the end-skip signal, which is then received by STB 152b. Triggers, for which trigger-associated information has been displayed, may then be deleted (870). In one embodiment of the invention, the trigger viewing engine 730 deletes displayed triggers from the marked triggers 720. The programming content is then displayed (880) in full screen mode on the screen 444.

Aggregation of Substitute Content

Figure 11A:
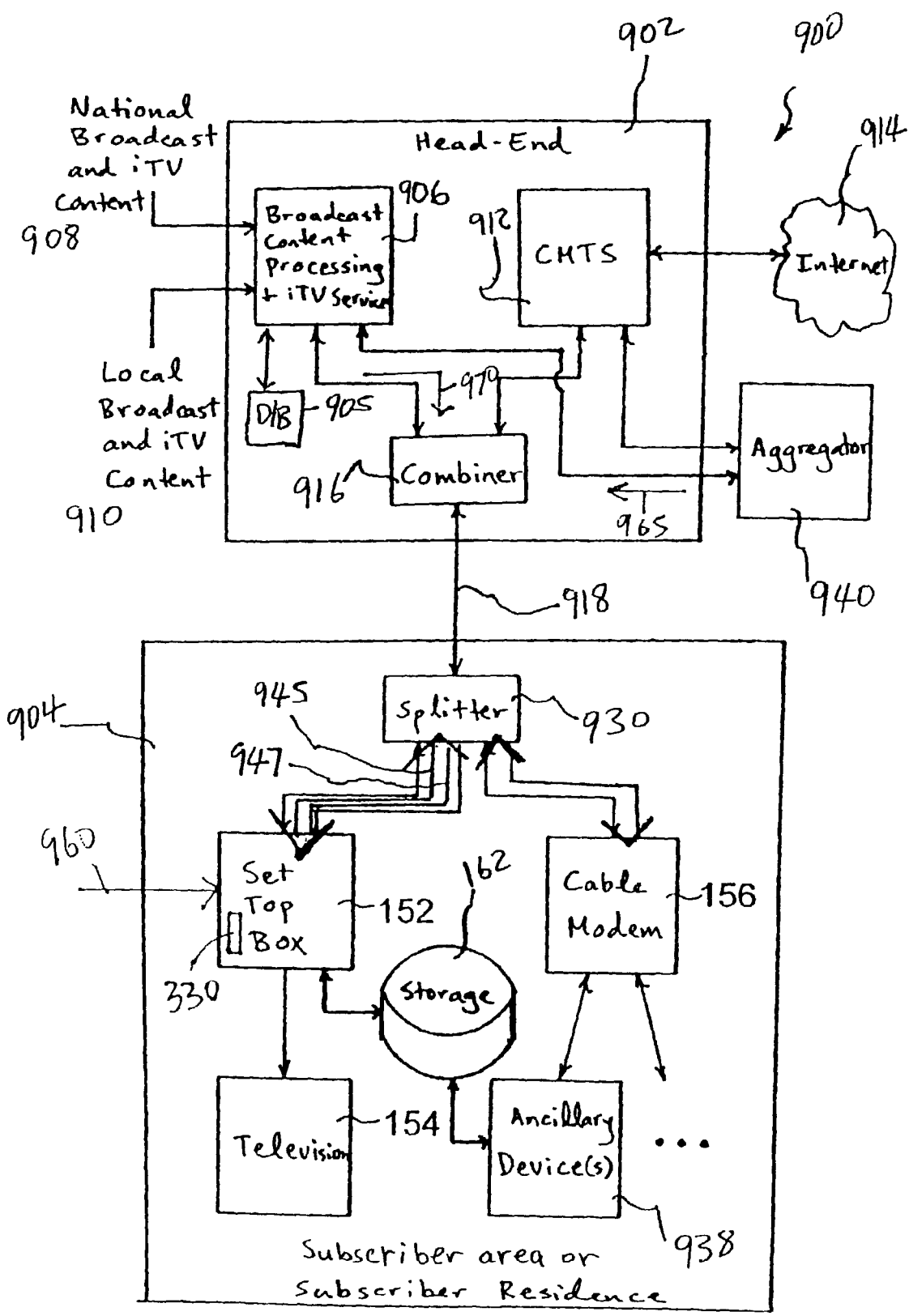
FIG. 11A is a block diagram of another interactive television system that can implement an embodiment of the invention.
Figure 11B:
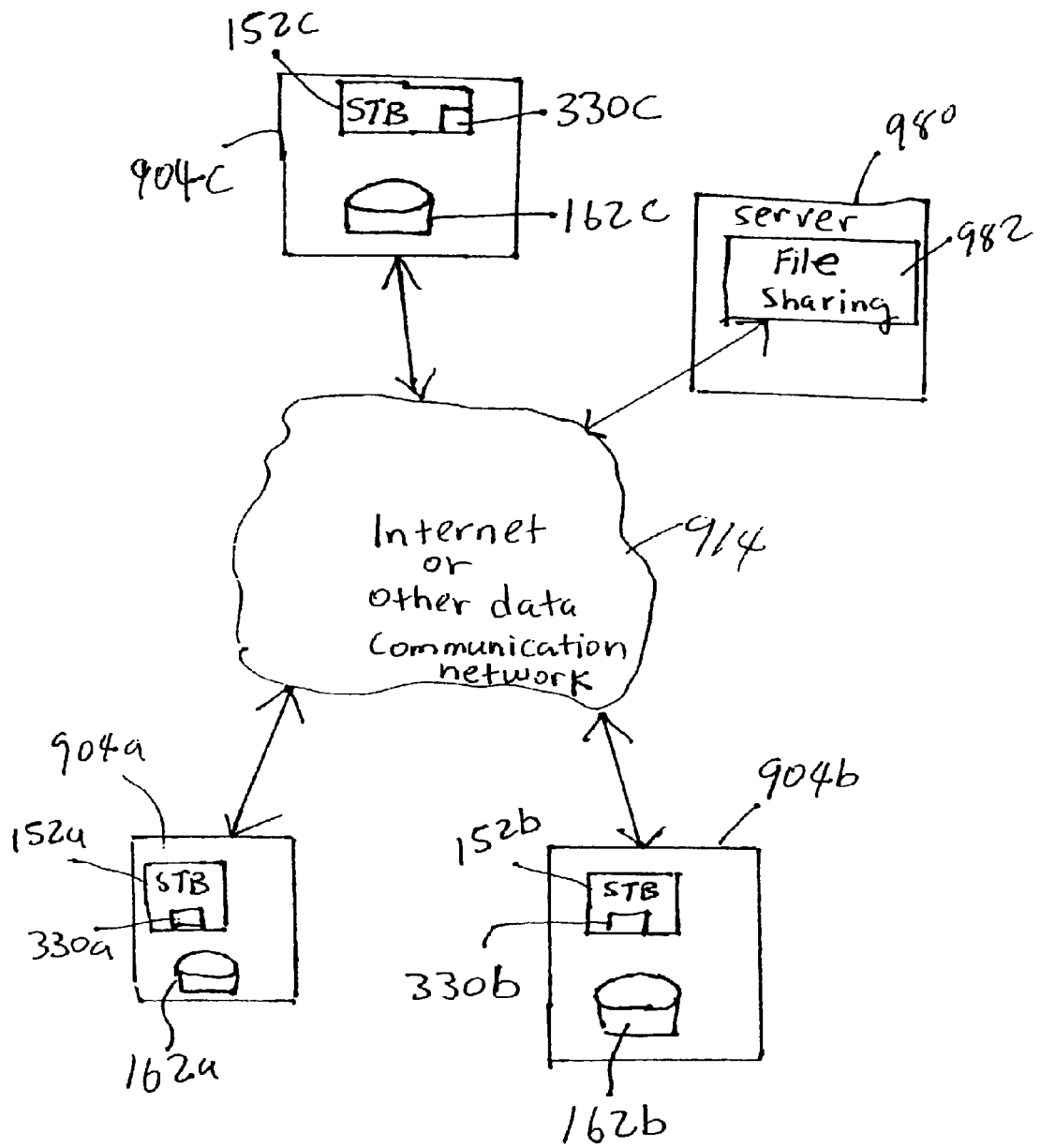
FIG. 11B is a block diagram of a system for permitting sharing of aggregated substitute content.

Referring now to FIG. 11A, shown generally at 900 is an interactive television system that can implement another specific embodiment of the invention. The system 900 includes one or more head-ends 902 (or broadcast centers) to distribute television broadcast content and interactive television (sometimes referred to as "iTV") content to a plurality of subscriber residences 904. The head-end 902 includes broadcast content processing and iTV services hardware and software (including processors, servers, storage media, databases, and so on), which are shown generally in FIG. 11A as a unit 906. The unit 906 can receive national broadcast content and iTV content 908 from content providers, satellite feeds, servers, and/or other sources. The unit 906 can also receive local broadcast content and iTV content 910 from parties such as local studios, servers, content providers, and/or other sources.

A cable modem termination system (CMTS) 912 provides the head-end 902 (and ultimately the subscriber residences 904) with access to the Internet 914. A combiner 916 places the signals and/or data provided by the unit 906 and the CMTS 912 into appropriate channels of a communication network 918. In accordance with an embodiment of the invention, the communication network 918 can include, for example, a hybrid fiber-coaxial cable distribution network comprising channels having a bandwidth of approximately six (6) MHz. Some of these channels of the communication network 918 are used to carry television signals (which may be accompanied by interactive content and other trigger information), while other channels are used for upstream and downstream communication of data with the Internet 914. Some other channels (sometimes referred to as "out-of-band" channels) of the communication network 918 may be used to carry electronic program guide (EPG) information. In one embodiment, at least one of these out-of-band channels may be used to carry aggregated television programming content and/or related data.

Examples of techniques that can be used to provide interactive content and other trigger information from the unit 906 to set top boxes (or other types of customer premise equipment) in the subscriber residences 904, via channels of the communication network 918, include MPEG methods that multiplex special data stream(s) into the digital video transport stream, encoding/embedding data in the vertical blanking interval (VBI) portion of the analog television video signals (e.g., ATVEF triggers), using out-of-band modems (e.g., Digital Audio-Visual Council or "DAVIC" modems) to provide the interactive content, and other such techniques that provide information related to the content of the television signals. For the channels of the communication network 918 that are used for communication of data to and from the Internet 914, protocols such as Data Over Cable Service Interface Specifications (DOCSIS), transmission control protocol/Internet protocol (TCP/IP), hypertext transfer protocol (HTTP), file transfer protocol (FTP), or other suitable protocols/techniques may be used.

In an embodiment of the invention, ATVEF triggers or other triggering mechanisms can be used to identify specific topics of particular television programming content in a television signal. For instance, if the sports segment of a news telecast is showing highlights of a particular baseball player's homerun, that baseball player can be identified in the trigger. As another example, triggers may be used to demarcate the beginning and ending locations of that baseball player's highlights, the sports segment, the commercial breaks of the news telecast, or the news telecast itself.

In an embodiment of the invention, an aggregator 940 can aggregate user-specified television programming content. The aggregator 940 can include a combination of hardware and software (such as one or more processors, one or more servers, databases and/or other storage media, software and other machine-readable instructions stored on a machine-readable medium, and so on) that delivers its aggregated content to client terminals of subscribers via at least one of the channels of the communication network 918, or via some other communication link (such as a DSL connection or telephone modem connection). The aggregator 940 can be located in the head-end 902 in one embodiment, while in other embodiments, the aggregator 940 can be located outside of the head-end 902, including somewhere in the Internet 914.

The aggregator 940 can be communicatively coupled to the unit 906 and/or to the CMTS 912. For instance, in several example implementations where the aggregator 940 operates to provide URL addresses (or other interactive information peculiar to the Internet 914 or other suitable data communication network) to the client terminals of subscribers, the aggregator 940 can be communicatively coupled to the CMTS 912. It is to be appreciated that the aggregator 940 need not necessarily be coupled to the CMTS 912 in some embodiments, provided that the aggregator 940 can aggregate television programming content from various sources and then deliver the aggregated television programming content to subscribers.

As mentioned, the aggregator 940 can be coupled to or comprise part of the unit 906, as depicted in FIG. 11A. In such an embodiment, the aggregator 940 can have access to a database 905 that stores user-specified preferences for programming content as provided by a viewer. For instance, entries in the database 905 may indicate that the particular viewer wishes to aggregate all highlights for a particular baseball player for a specified time period. The database 905 may further identify the viewer by residence address, identification code of the viewer's client terminal (e.g., a set top box or recording device having network connectivity), or other information to uniquely identify the viewer from other viewers. Then, the aggregator 940 can monitor television signals provided from sources 908 and 910 to the unit 906 for that baseball player's highlights for the specified time period, and then store the highlights in a storage unit (e.g., database 905) at the head-end 902.

Various techniques may be used by the aggregator 940 to locate the user-specified television programming content. In one embodiment, the aggregator 940 can read triggers of all television signals that arrive at the unit 906, so as to identify the topics/content of the television signals as specified in the triggers, and then correlate the trigger content with the entries in the database 905. If relevant television programming content segments are detected from the triggers, then the aggregator 940 records such segments. In another embodiment, the aggregator 940 can identify television programming content segments of interest by reading close-captioning data that accompanies the television signals. Alternatively or in addition, the aggregator 940 can scan EPG information that is provided to the head-end 902, with the EPG information specifying data such as show titles, actors, subjects, and the like.

Various other techniques can be used by the aggregator 940 to aggregate television programming content and to provide the aggregated television programming content to subscribers. Examples of these techniques include receiving the television programming content from third-party entities that collect the programming content as a service, or receiving the television programming content via direct feeds from content providers to the aggregator 940.

At the residence 904, a splitter 930 is coupled to receive the television signals (including interactive content and other trigger information) from the communication network 918. The splitter 930 sends the received television signals (including interactive content and other trigger information) to a first client terminal, such as a set top box 152, which subsequently sends the signals and other information to a television 154. As will be understood by those skilled in the art, the set top box 152 includes components such as digital/analog video processing unit(s), VBI decoders, central processing units, memory, video graphics processing unit(s), software, and other components that can detect, extract, and process trigger information and other interactive content that is received from the communication network 918. For instance, these components can extract URL addresses from the trigger information and present the URL addresses as hypertext links or other visual indicator on the television 154, which the viewer can "click" to connect to the Internet 914 (or other suitable data communication network). The operation of these components is generally known to those of ordinary skill in the art. Accordingly, the specifics of their operation are not shown in FIG. 11A or described in further detail herein for the sake of simplicity of explanation.

As previously stated above, the set top box 152 can include or be coupled to the storage unit 162. The storage unit 162 can comprise a machine-readable storage medium such as a cache, buffer, memory, diskette, compact disk, tape, flash memory, random access memory (RAM) or the like and their associated hardware, in one embodiment. In an embodiment the storage unit 162 can comprise a hard disk such as a digital or personal video recorder (DVR or PVR).

In some embodiments, the splitter 930 can be coupled to the cable modem 156. With basic embodiments of the splitter 930, the cable modem 156 receives the same input as the set top box 152 (e.g., receives the same television signals). With more complicated embodiments of the splitter 930, the cable modem 156 and the set top box 152 may receive different channels. Whether receiving the same or different channels from the splitter 930, a primary function of the cable modem 156 is to provide one or more ancillary devices 938 with access to the Internet 914. Examples of the ancillary device 938 can include, but not be limited to, Personal Computers (PCs), wireless handheld devices, companion set top boxes, two-way advanced remote controls, or other browser-enabled display devices or client terminals that have the capability to communicate with the Internet 914. The ancillary device(s) 938 can include or be coupled to the storage unit 162 (or other storage unit).

In operation according to an embodiment, aggregated television programming content can be sent to the storage unit 162 (or to the memory 330 in the STB 152) by the aggregator 940. This may be done by way of broadcast, IP multicast, or unicast from the aggregator 940 to storage unit(s) 162 of one or more subscriber residences 904. In accordance with an embodiment of the invention, the aggregated television programming content can be sent to the storage unit 162 by first identifying the storage unit that is to receive the aggregated television programming content, such as via an identification number of the storage unit 162, and then sending the aggregated television programming content to the storage unit 162 in a format that is compatible with the particular communication network and with the storage unit 162 (such as a digital format). For example, the aggregated television program can be sent to the storage unit 162 by way of the CMTS 912, through a channel of the communication network 918 that uses the DOCSIS protocol, and then to the cable modem 156. Alternatively or in addition, an out-of-band channel may be used to send the aggregated television programming content from the aggregator 940. In yet other embodiments, the aggregated television programming content may be sent to the storage unit 162 via a different connection to the Internet 914, or the aggregated television programming content may be sent via one of the available channels of the communication network 918.

Afterwards, incoming real-time television programming content (or buffered incoming programming content) is monitored by the set top box 152 for triggers that demarcate commercial breaks. In accordance with one embodiment of the invention when a trigger is received to indicate the beginning of a commercial break in the real-time television programming content, the television 154 is coupled to the storage unit 162 for playback of the stored programming content during the commercial break. When a trigger is received to indicate the end of the commercial break, the input to the television 154 is switched from the storage unit 162 back to the real-time programming content. During presentation of the real-time television programming content, a pause feature of the storage unit 162 may be used to pause or otherwise mark the stored television programming content, so that when it resumes playing during a subsequent commercial, it can begin playback at the proper location.

As similarly described above, the stored programming content (e.g., substitute content) 442 may also be displayed to a viewer during a break in the incoming television program (or during a break in the buffered incoming television program) by having the viewer enable a command 426 for displaying the stored programming content.

In accordance with another embodiment of the invention, the aggregated television programming content may be delivered for presentation by way of switching to a channel where the programming content is carried. For example, the aggregator 940 may first store the aggregated television programming content in the storage unit 905 at the head-end 902. Upon recognition of a trigger that demarcates the beginning of a commercial break in a real-time television programming content, the set top box 152 can send a signal to the unit 906 at the head-end 902 to instruct the unit 906 to provide the aggregated television programming content. The unit 906 then sends a command back to the set top box 152 that instructs the set top box 152 to tune/switch from the channel of the real-time programming content (e.g., channel 945) to a different channel (i.e., a dedicated broadcast channel 947) where the aggregated programming content is to be carried. The aggregated television programming content is then delivered on that dedicated broadcast channel 947 to the set top box 152 by the unit 906. The process can work similarly (in reverse) when the set top box 152 recognizes a trigger that demarcates the end of the commercial break, resulting in a switch back to the original channel 945 and the pausing of the aggregated television programming content.

The set top box 152 can also tune/switch from the original channel 945 to the dedicated broadcast channel 947 (and tune/switch from the dedicated broadcast channel 947 to the original channel 945) by having the viewer enable appropriate commands 960.

In another embodiment of the invention, aggregator 940 directs commands 965 to STB 152 to tune to a particular channel (e.g., channel 947) at a particular time based on user-specified television programming content preferences. The aggregator 940 may also command STB 152 to begin recording and end recording so as to only record the programming content corresponding to the user preferences. The programming content may be recorded in, for example, the storage medium 162. At a later time, aggregator 940 can then command STB 152 to substitute a live programming content (or buffered incoming programming content) with the recorded programming content. The advantages of recording locally at the STB 152 may include the following: (1) the programming content does not have to be captured and recorded at the aggregator 940 and then transmitted to the STB 152, and (2) dedicated bandwidth for transmission of the aggregated programming content is not required. In this embodiment, preferably, the STB 152 will ignore commands received from aggregator 940 if STB 152 is currently tuned to a channel, indicating that the STB is in use. If the STB 152 has dual channel tuning capability and dual channel recording capability, then STB 152 may display the programming content from a first channel and still record from another channel as specified by the aggregator 940.

In the above-embodiment, if the STB 152 has only single channel tuning and single channel recording capability, then programming content aggregation can be accomplished during periods in which the STB 152 is not being used (e.g., during late at night or when the user is on vacation). This is because the only available resource is utilized during regular television viewing. If the STB 152 has dual channel tuning and dual channel recording capability, then one channel can be used for the aggregation of programming content, while another channel can be used for regular television viewing.

It is to be appreciated that in other embodiments, the unit 906 can be capable of detecting triggers that demarcate the beginning and ending of commercial breaks. In such embodiments, the unit 906 can send a command 970 to the set top box 152 to tune to the channel where the aggregated television programming content is to be carried, instead of having the set top box 152 send a signal to the unit 906 that requests playback of the aggregated television programming content.

Figure 12:
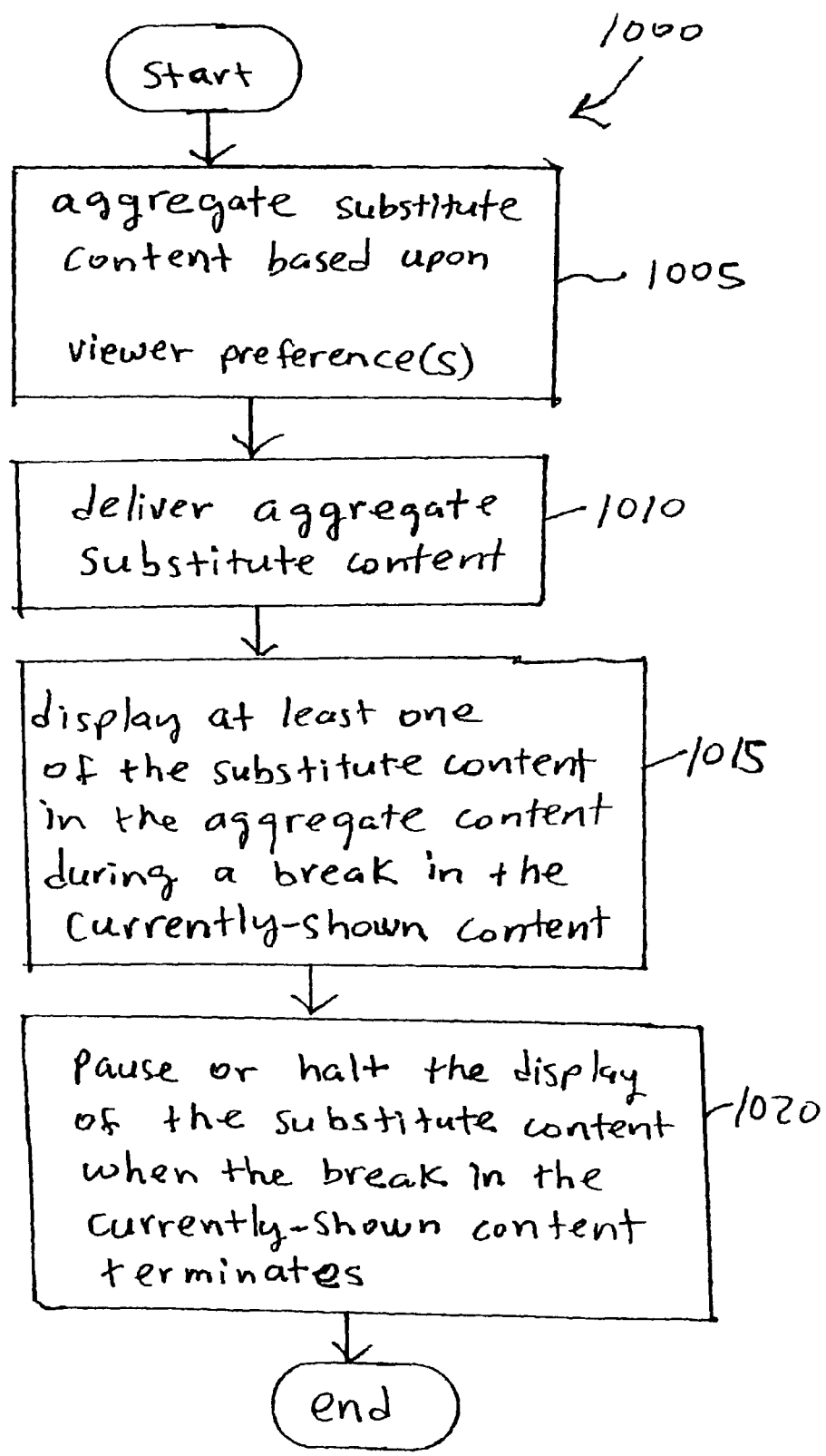
FIG. 12 is a flowchart of a method of collecting and displaying aggregated substitute content, in accordance with an embodiment of the invention.

In another embodiment as shown in FIG. 12, various subscriber areas 904a to 904c can communicate with each other via the Internet 914 or other data communication network. The number of subscriber areas 904 may vary. A server 980 may include an application 982 that permits the following functions. For example, a user at the area 904a may be able to access directories in the memory 330b or hard drive 162b (in area 904b) or directories in the memory 330c or hard drive 162c (in area 904c) to a file-sharing system via the Internet or network 914. The user in area 904a may then view and download the aggregated content in the accessed directories of the above-mentioned memory devices. The downloaded aggregated content may be stored in the memory devices 330a and/or 162a and displayed during a break in a programming content that is being received by the STB 1512a.

Similarly, a user in the area 904b may be able to access directories of memory devices in areas 904a and 904c and download aggregated content that are stored in those memory devices.

FIG. 12 is a flowchart of a method 1000 for collecting and displaying aggregated substitute content in accordance with a specific embodiment of the invention. The method 1000 first aggregates (1005) substitute content based upon user or viewer preference(s). The aggregate content may then be delivered (1010) to a customer premise equipment (e.g., set top box 152) of the viewer. During a break in a currently-shown content, at least one of the substitute content in the aggregate content may be displayed (1015). When the break in the currently-shown content terminates, the display of the substitute content may be paused or halted (1020). The currently-shown content may continue to be displayed.

Other variations and modifications of the above-described embodiments and methods are possible in light of the foregoing teaching. For example, the components, modules and software shown in FIGS. 3 and 4 may be implemented in a processing device such as a personal computer or a suitable notebook computer.

Further, at least some of the components of this invention may be implemented by using a programmed general purpose digital computer, by using application specific integrated circuits (ASICs), programmable logic devices (PLDs) or field programmable gate arrays (FPGAs), or by using a network of interconnected components and circuits. Connections may be wired, wireless, by modem, and the like.

It is also within the scope of the present invention to implement a program or code that can be stored in an electronically-readable medium to permit a computer to perform any of the methods described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for performing a substitution for a broadcast content, the method comprising:
   receiving broadcast content and one or more user-selectable triggers associated with the broadcast content, the one or more user-selectable triggers comprising addresses to respective interactive sites corresponding to the broadcast content;
   marking, during a presentation of the broadcast content, at least one of the one or more user-selectable triggers in the broadcast content in response to a user command, wherein marking comprises, without first displaying information from a selected interactive site associated with the at least one marked trigger, storing address information for the selected interactive site associated with the at least one marked trigger;
   detecting a break in the broadcast content, wherein the break comprises one or more of a commercial segment, a broadcast stoppage, or non-activity in a broadcast event; and
   automatically displaying without user intervention, the information from the same selected interactive site associated with the at least one trigger that was marked during the presentation of the broadcast content in response to the break in the broadcast content.

2. The method of claim 1, further comprising:
   displaying the broadcast content when the break terminates.

3. The method of claim 1, wherein the broadcast content comprises live programming content.

4. The method of claim 1, wherein the broadcast content comprises buffered programming content.

5. The method of claim 1, wherein the broadcast content comprises video telecast content.

6. The method of claim 1, wherein the broadcast content comprises teleconference content.

7. The method of claim 6, wherein the teleconference content comprises remote learning session broadcast content.

8. The method of claim 6, wherein the teleconference content comprises video conference content.

9. The method of claim 1, wherein the break in the broadcast content also comprises a commercial skip segment.

10. The method of claim 1, wherein the information from the selected interactive site comprises live broadcast content.

11. The method of claim 1, wherein the information from the selected interactive site comprises buffered broadcast content.

12. The method of claim 1, wherein the information from the selected interactive site comprises recorded broadcast content.

13. The method of claim 1, wherein the information from the selected interactive site comprises Internet Protocol channel content.

14. The method of claim 13, wherein the Internet Protocol channel content comprises streaming video.

15. The method of claim 13, wherein the Internet Protocol channel content comprises electronic mail interaction.

16. The method of claim 1, wherein the information from the selected interactive site is displayed in full screen mode.

17. The method of claim 1, wherein the information from the selected interactive site is displayed as a main screen view and the broadcast content is displayed as a picture-in-picture.

18. The method of claim 1, wherein the information from the selected interactive site is displayed in the screen foreground and the broadcast content is displayed in the screen background.

19. The method of claim 1, wherein the information from the selected interactive site is displayed in a first screen area and the broadcast content is displayed in a second screen area.

20. The method of claim 1, further comprising:
   displaying a timer to indicate a time length for showing the information from the selected interactive site.

21. The method of claim 1, further comprising:
   recording the broadcast content when the information from the selected interactive site is displayed.

22. The method of claim 1, further comprising:
   pausing the broadcast content when the break ends.

23. The method of claim 1, further comprising:
   including a tag to prevent disruption of the display of the broadcast content during the occurrence of the break.

24. The method of claim 23, further comprising:
   paying an operator to include the tag in the broadcast content.

25. The method of claim 23, further comprising:
paying an operator to disable the tag.

26. The method of claim 1, wherein the information from the selected interactive site is loaded prior to the break in the broadcast content.

27. The method of claim 1, further comprising:
aggregating at least one substitute content based upon a viewer preference.

28. The method of claim 1, wherein the broadcast content is recorded to permit viewing of a missed segment in the broadcast content when the display of the information from the selected interactive site terminates.

29. The method of claim 1, wherein a pre-selected segment of the broadcast content is recorded during display of the information from the selected interactive site.

30. The method of claim 29, wherein the pre-selected segment is content replayed during the showing of the broadcast content.

31. The method of claim 29, wherein the pre-segment is viewed while displaying close caption text from the broadcast content.

32. The method of claim 1, wherein the interactive site can receive a purchase or request from the viewer.

33. An article of manufacture, comprising:
a non-transitory machine-readable medium having stored thereon instructions to:
receive broadcast content;
receive a user-selectable trigger associated with the broadcast content, the user selectable trigger comprising an address corresponding to a location of information associated with the broadcast content;
mark, during a presentation of the broadcast content, the user-selectable trigger in the broadcast content in response to a user command, wherein marking comprises storing the address corresponding to the location of information associated with the broadcast content;
identify an occurrence of a break in the broadcast content, wherein the break comprises one or more of a commercial segment, a broadcast stoppage, or non-activity in a broadcast event; and
delay, until the occurrence of the break, using the marked trigger to automatically download, without user intervention, the information associated with the broadcast content from the same location corresponding to the stored address marked during the presentation of the broadcast content.

34. An apparatus for substituting broadcast content displayed on a screen, the apparatus comprising:
means for displaying broadcast content and at least one trigger associated with the broadcast content;
means for marking, during the display of the broadcast content, the at least one trigger in the broadcast content in response to a user command, wherein marking comprises downloading, without displaying, information from an address corresponding to the broadcast content;
means for determining an occurrence of a break in the broadcast content, wherein the break comprises one or more of a commercial segment, a broadcast stoppage, or non-activity in a broadcast event; and
means for automatically displaying, without user intervention, the same downloaded information associated with the trigger that was marked during the presentation of the broadcast content in response to the occurrence of the break.

* * * * *